US012678352B2

(12) United States Patent
Cociuban

(10) Patent No.: US 12,678,352 B2
(45) Date of Patent: Jul. 14, 2026

(54) DESCENDING MECHANISED ACCESS RAMP (D-MAR)

(71) Applicant: Mircea Eugen Virgil Cociuban The Trustee for Rofraus Trust, Maroubra (AU)

(72) Inventor: Mircea Eugen Virgil Cociuban, Maroubra (AU)

(73) Assignee: Mircea Eugen Virgil Cociuban The Trustee for Rofraus Trust, Maroubra (AU)

( * ) Notice: Subject to any disclaimer, the term of this patent is extended or adjusted under 35 U.S.C. 154(b) by 685 days.

(21) Appl. No.: 18/017,437

(22) PCT Filed: Jul. 21, 2021

(86) PCT No.: PCT/AU2021/050784
§ 371 (c)(1),
(2) Date: Jan. 23, 2023

(87) PCT Pub. No.: WO2022/016218
PCT Pub. Date: Jan. 27, 2022

(65) Prior Publication Data

US 2023/0293365 A1 Sep. 21, 2023

(30) Foreign Application Priority Data

Jul. 22, 2020 (AU) ................................ 2020902542

(51) Int. Cl.
*B61D 47/00* (2006.01)
*A61G 3/06* (2006.01)

(52) U.S. Cl.
CPC .............. *A61G 3/067* (2016.11); *A61G 3/061* (2013.01); *B61D 47/00* (2013.01)

(58) Field of Classification Search
CPC ......... A61G 3/067; A61G 3/061; B61D 47/00
See application file for complete search history.

(56) References Cited

U.S. PATENT DOCUMENTS 4,576,539 A * 3/1986 Williams ............... A61G 3/063
414/921
5,380,144 A * 1/1995 Smith .................... A61G 3/061
14/71.3

(Continued)

FOREIGN PATENT DOCUMENTS

| | | |
|---|---|---|
| CN | 109552341 | 4/2019 |
| WO | WO 02/079018 | 10/2002 |

OTHER PUBLICATIONS

International Preliminary Report on Patentability Dated Nov. 10, 2021 From the International Preliminary Examining Authority Re. Application No. PCT/AU2021/050784. (9 Pages).

(Continued)

*Primary Examiner* — Abigail A Risic

(57) ABSTRACT

A descending mechanised access ramp (D-MAR) system is provided for enabling independent access between a train floor and a station platform. The system comprises a substantially planar casing box mounted in the train floor and housing a hinged jointed sliding ramp. The ramp includes a plurality of side wheels configured to allow the ramp to slide within the casing box. A remote-controlled deployment mechanism is arranged to automatically move the ramp between a standby position within the casing box and a fully deployed position in which a nose portion of the ramp slidably engages the station platform. At least two mobile protection walls are positioned on the station platform and include tactile push buttons configured to trigger flashing lights arranged on bollards associated with the protection walls and to activate the remote-controlled deployment mechanism of the D-MAR system, thereby facilitating safe and assisted deployment of the ramp for passenger access.

15 Claims, 26 Drawing Sheets

(56) References Cited

U.S. PATENT DOCUMENTS

| | | | | | |
|---|---|---|---|---|---|
| 5,832,555 | A * | 11/1998 | Saucier | B60P 1/431 14/71.1 |
| 6,089,817 | A * | 7/2000 | Tauer | A61G 3/067 414/921 |
| 6,186,733 | B1 * | 2/2001 | Lewis | B60P 1/431 414/921 |
| 6,860,701 | B2 * | 3/2005 | Kiser | B60P 1/431 414/921 |
| 9,545,345 | B1 * | 1/2017 | Akers, Jr. | A61G 3/0272 |
| 10,493,893 | B2 * | 12/2019 | Matsuoka | B60P 1/436 |
| 10,813,802 | B2 * | 10/2020 | Hill | A61G 3/061 |
| 2008/0276832 | A1 | 11/2008 | Chisena | |
| 2009/0106918 | A1 | 4/2009 | Van Roosmallen et al. | |
| 2014/0147237 | A1 * | 5/2014 | Rasekhi | B60R 3/02 414/537 |
| 2021/0122295 | A1 * | 4/2021 | Sato | A61G 3/061 |
| 2022/0409452 | A1 * | 12/2022 | Kotagi | A61G 3/067 |

OTHER PUBLICATIONS

International Search Report and the Written Opinion Dated Aug. 13, 2021 From the International Searching Authority Re. Application No. PCT/AU2021/050784. (15 Pages).

Dwight et al. "Lenslet Array Tunable Snapshot Imaging Spectrometer (LATIS) for Hyperspectral Fluorescence Microscopy", Biomedical Optics Express 8(3): 1950-1964, Mar. 1, 2017.

* cited by examiner

GENERAL VIEW
NOT TO SCALE

DESCENDING MECHANISED ACCESS RAMP (D-MAR)

RELATED APPLICATIONS

This application is a National Phase of PCT Patent Application No. PCT/AU2021/050784 having International filing date of Jul. 21, 2021, which claims the benefit of priority of Australia Patent Application No. 2020902542 filed on Jul. 22, 2020. The contents of the above applications are all incorporated by reference as if fully set forth herein in their entirety.

FIELD AND BACKGROUND OF THE INVENTION

The present invention relates to access ramps and in particular to an access ramp for facilitating access to elevated or displaced positions.

Specific embodiments of the invention are directed to a remote controlled deployable access ramp, designed to be used by disabled people in wheelchairs, people with prams and other less able people, in order to provide an independent access to public transport (trains, tramways and buses), shopping centres, public buildings, private properties and any other edifices.

Significant efforts are actually made around the world to provide an independent access for disabled persons on wheelchairs to the public transport and generally to the "day by day" facilities.

On the train stations, the gap between the edge of the platform and the train floor is measured as a sum of the horizontal and vertical gap.

In the USA, the Accessibility Guidelines for Buildings and Facilities suggests a vertical gap less than 16 mm and a horizontal gap less than 76 mm.

In Europe, the Rail Vehicle Accessibility Regulations 2010 stipulates a vertical gap less than 50 mm and a horizontal gap less than 75 mm, in order to provide a wheelchair independent access to the trains.

In Australia, in order to provide an independent access for disabled passengers to the trains, the Disability Standards for Accessible Public Transport (2002) recommends a vertical gap below 15 mm and a horizontal gap below 40 mm, in accordance with AS3856.1-1998.

On some trains, permanent fixed or mechanised devices are installed to improve the access to the trains.

U.S. Pat. No. 7,913,628 of Chisena, M P 2008 ("Train-to-platform gap mitigator"), disclose different gap filling mechanisms from train to platform, to cover the horizontal and vertical gaps, on tangent and curved track. However, these gap-fillings do not provide fully independent and safe access to the train for disabled persons on wheelchairs. The ramp is fully made of metallic materials, which are electricity conductive, creating a risk of electrocution for commuters.

US Patent Application Publication 2008/0134930 A1 of Drago, J J 2008 ("Train car compensator for platform gap spacing"), discloses a train car compensator that needs to be fitted to the train door. The compensator slides over the track, actioned by a spring, piston or a cable with a hinge connection. This technique is not suitable for curved tracks where the gap varies along the length of the landing plate.

Korean Patent KR 20110102638A (PEOPLE & ENVIRONMENT CO., LTD) 19 Sep. 2011 ("Ramp for Wheelchair"), disclose a single metallic panel as a ramp, actioned by a well-known scissor mechanism. This ramp does not provide a compliant and an independent access to the train for disabled people in wheelchair: the ramp has a steep slope, the mechanism is unsafe to deploy the ramp and the ramp is unsafe to use (electricity conductive material, no handrails, requires significant assistance to the person on wheelchair).

U.S. Pat. No. 5,832,555, dated 10 Nov. 1998, by SAUCIER et al. ("Compact Moveable Ramp Assembly"), discloses a ramp for facilitating passengers with limited mobility to board and unload from vehicles, in particular buses. This ramp is not safe to be deployed, can easily damage the footpath and do not provide a compliant and independent access for disabled people on wheelchair. Also, the ramp is made of fully metallic material, which is electricity conductive. The ramp does not have handrails, therefore is not safe to be used by public.

A reference herein to a patent document or any other matter identified as prior art, is not to be taken as an admission that the document or other matter was known or that the information it contains was part of the common general knowledge as at the priority date of any of the claims.

SUMMARY OF THE INVENTION

According to an aspect of the invention, there is provided a Descending Mechanised Access Ramp (D-MAR) system for providing independent access for persons between a floor of a train and a station platform, the D-MAR system including:

- a substantially planar casing box mountable to or embedded within a floor of the train;
- a hinged jointed sliding ramp, installed inside the substantially planar casing box;
- a plurality of side wheels installed on sides of the hinged jointed sliding ramp, adapted to allow the hinged jointed sliding ramp to be slidably moveable inside the substantially planar casing box;
- a remote-controlled deployment mechanism configured to automatically deploy the hinged jointed sliding ramp between a stand-by position within the casing box on the floor of the train and a fully deployed position, such that a nose of the sliding ramp is slidably engaged with the station platform;
- wherein the remote-controlled deployment mechanism is configured to automatically move two mobile protection walls against the fully deployed sliding ramp, to provide access for a person; and
- one or more optical and/or proximity sensors installed on the train and one or more optical and/or proximity sensors installed on the sliding ramp to control the deployment of the sliding ramp.

According to another aspect of the invention, there is provided a system for providing access to a vehicle from a surface external to the vehicle, the system comprising:

- a case adapted for attachment to or embedding in a floor of the vehicle;
- a slidable ramp installed inside the case and adapted for slidable movement within the case;
- a remote control mechanism adapted for operation of the slidable ramp by an operator, wherein the remote control mechanism is configured to move the slidable ramp between a stand-by position where the ramp is substantially within the case, to a fully deployed position where the ramp is in a fully extended position, providing access between the vehicle and the surface external to the vehicle;

wherein, the remote control mechanism is operable using at least one switch in the vicinity of the vehicle for activation by the operator.

Embodiments of the Descending Mechanised Access Ramp (D-MAR) is a remote controlled equipment designed to provide an easy, safe and independent access for disabled persons on wheelchairs and passengers with reduced mobility from the train floor to the station platform, as well as from the platform station to the train floor.

The D-MAR can be also used by aged population, persons with reduced mobility, persons with prams and heavy luggage, as well as by general public.

Furthermore, the D-MAR may facilitate the loading and unloading of general merchandise to and from cars, trucks, trains or buildings.

As a main application, the D-MAR is described hereafter as a facility to be installed on the train stations to provide independent access to trains for disabled persons on wheelchairs, where the excessive horizontal and vertical gaps between the platforms and the train floors do not satisfy the Standard requirements. However, it will be appreciated that the D-MAR described herein has other applications.

In accordance with another embodiment of the present invention, there is provided a Descending Mechanised Access Ramp (D-MAR) system for providing independent access for persons on wheelchairs between a floor of a train and a station platform, the Descending Mechanised Access Ramp system including:

- a substantial planar casing box mountable to a train floor;
- a hinged jointed sliding ramp, installed inside the casing box;
- a number of side wheels installed on the sides of the sliding ramp, to allow the sliding ramp to skate inside the casing box;
- a remote controlled deployment mechanism configured to automatically deploy the sliding ramp between a stand-by position within the casing box on the train floor and a fully deployed position, such that the nose of the sliding ramp is engaged with the station platform;
- one or more optical and/or proximity sensors can be installed on the train doors and/or the doorsteps and one or more optical and/or proximity sensors can be installed on the ramp, in order to control the deployment of the sliding ramp and to facilitate the return to the stand-by position;
- D-MAR is equipped with a movement controller, capable to stop the deployment of the sliding ramp, for example, if a physical or human obstacle occurs;
- a wireless communication system having an in-vehicle system onboard the train and an on-platform system located on the station platform, the wireless communication system being configured to;
  - a. wirelessly communicate between the in-vehicle system and the on-platform system;
  - b. communicate the intent to deploy the system between all components of the system and trigger warning devices appropriately throughout the system.

In some embodiments, the casing box has an adequate profile, a width and a height sufficient to allow the sliding ramp to be fully stored within the casing box in the stand-by position and to permit an angular deployment of the sliding ramp onto the station platform.

In some embodiments, two or more safety bollards are installed on the station platform, in order to protect and localise the boarding assistance zone and to accommodate one or more warning tactile push buttons.

In some embodiments, the tactile push buttons are configured to trigger the flashing lights installed on top of the safety bollards and to activate the remote controlled deployment mechanism of the D-MAR.

In some embodiments, two mobile protection walls are configured to tie-up against the deployed sliding ramp, in order to provide a safe embarkment to and from the train for disabled persons on wheelchair.

In some embodiments, the remote-controlled deployment mechanism includes an electromechanical swing system for enabling the sliding ramp to skate longitudinally inside the casing box and to allow an angular deployment of the sliding ramp onto the station platform.

In some embodiments, the remote controlled deployment mechanism includes a scissor structure and jack system for enabling the sliding ramp to skate longitudinally inside the casing box and to allow an angular deployment of the sliding ramp onto the station platform.

In some embodiments, the remote controlled deployment mechanism includes a rack and pinion steering system for enabling the sliding ramp to skate longitudinally inside the casing box and to allow an angular deployment of the sliding ramp onto the station platform.

In some embodiments, the remote controlled deployment mechanism includes a teeth belt or chain and pulley system for enabling the sliding ramp to skate longitudinally inside the casing box and to allow an angular deployment of the sliding ramp onto the station platform.

In some embodiments, the D-MAR system is installed on a new train during manufacture of the train.

In some embodiments, the D-MAR retrofits to existing trains.

In accordance with another embodiment of the invention, there is provided a system for providing access to a vehicle, the vehicle having at least two opposing entry/exit points, the system comprising:

- a slidable hingeable ramp positioned between the at least two opposing entry/exit points;
- a mechanism adapted for operation of the slidable ramp in at least a plurality of configurations;
- wherein, the plurality of configurations includes at least:
  - i. a standby configuration, wherein the slidable ramp is substantially positioned between the at least two opposing entry/exit points;
  - ii. a first entry/exit configuration, wherein the slidable ramp is extended outside one of the at least two opposing entry/exit points to a first surface external to the vehicle; and
  - iii. a second entry/exit position, wherein the slidable ramp is extended outside an opposing entry/exit point to a second surface external to the vehicle.

In accordance with a further embodiment of the invention, there is provided a system for providing access to a vehicle, the vehicle having at least two opposing entry/exit points, the system comprising:

- a first slidable ramp adapted to extend from a stored configuration within the vehicle, through a first entry/exit point to provide an access surface connecting between a floor of the vehicle and a first surface outside the vehicle;
- a second slidable ramp adapted to extend from a stored configuration within the vehicle, through a second entry/exit point to provide an access surface connecting between a floor of the vehicle and a second surface outside the vehicle; and
- an actuator mechanism configured to selectively deploy one or both of the first and second slidable ramps.

In some embodiments, the D-MAR is installable on other vehicles such as buses, trams or boats. In the case of a bus, the surface outside the bus may be a footpath or sidewalk.

BRIEF DESCRIPTION OF THE SEVERAL VIEWS OF THE DRAWINGS

Example embodiments of the disclosure will now be described, by way of example only, with reference to the accompanying drawings.

The drawings describe the concept design of a remote controlled Descending Mechanised Access Ramp (D-MAR), which can provide independent access for disabled persons on wheelchair from the train floors down to the station platforms.

The drawings describe different deployment stages of the D-MAR, from the "stand-by" (not in use) position to "fully deployed" position, when is ready to be used by disabled persons on wheelchairs or other passengers.

Figure 1:
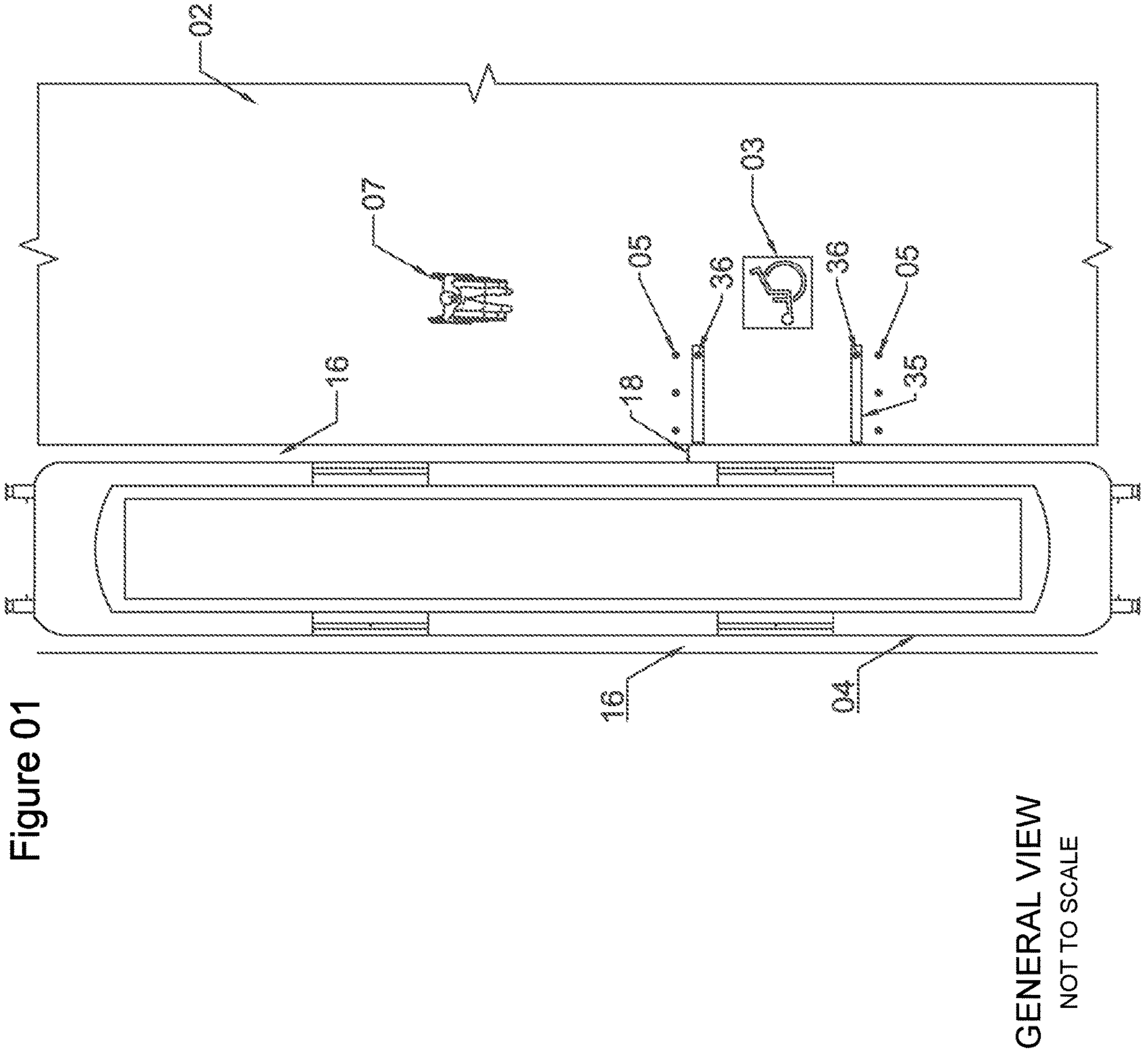

FIG. 1: General View of a train station platform, with a Disabled Person on Wheelchair approaching the Boarding Assistance Zone.

Figure 2:
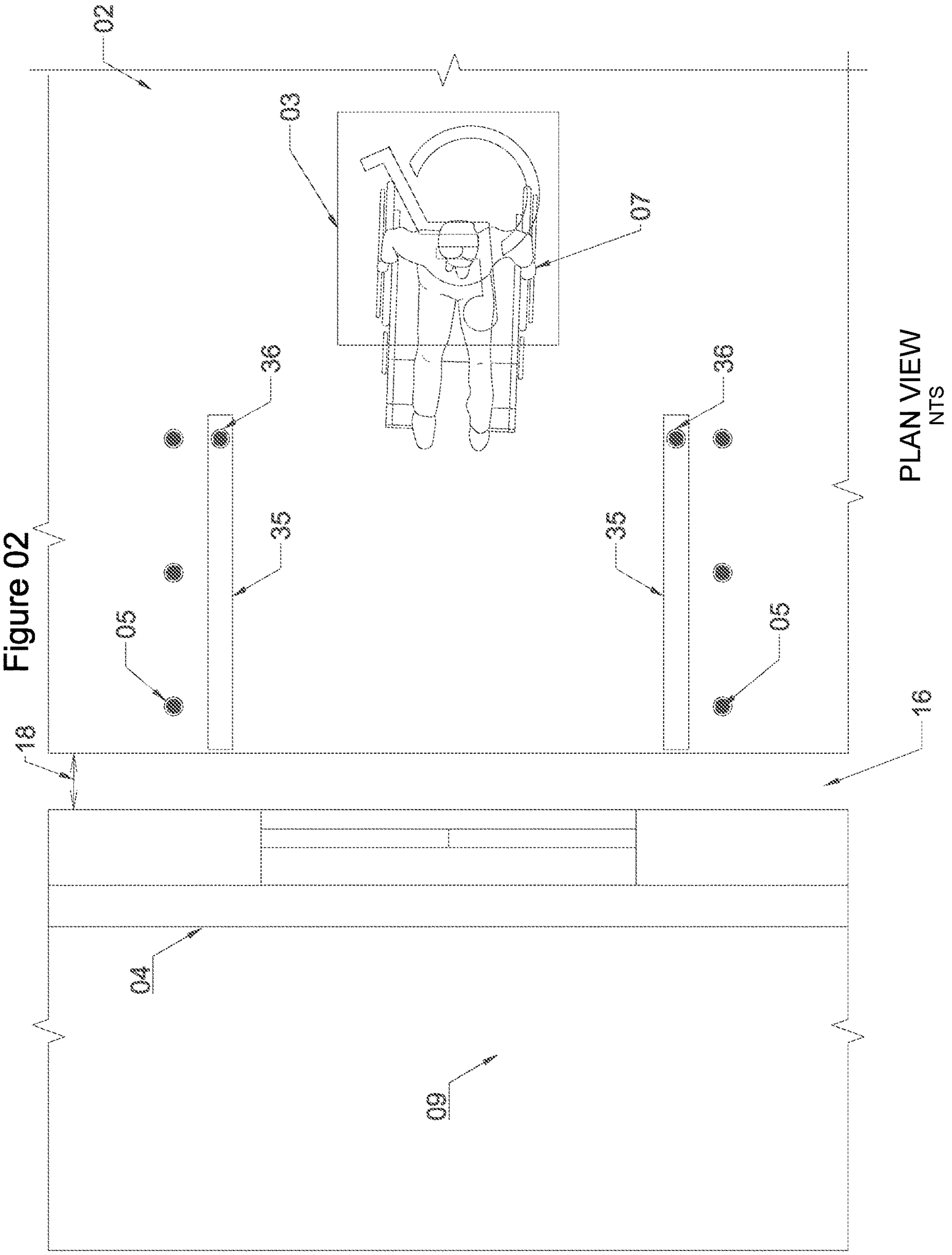

FIG. 2: Plan View of the platform of the train station, with a disabled person on wheelchair waiting on the Boarding Assistance Zone to use the D-MAR to access the train.

Figure 3:
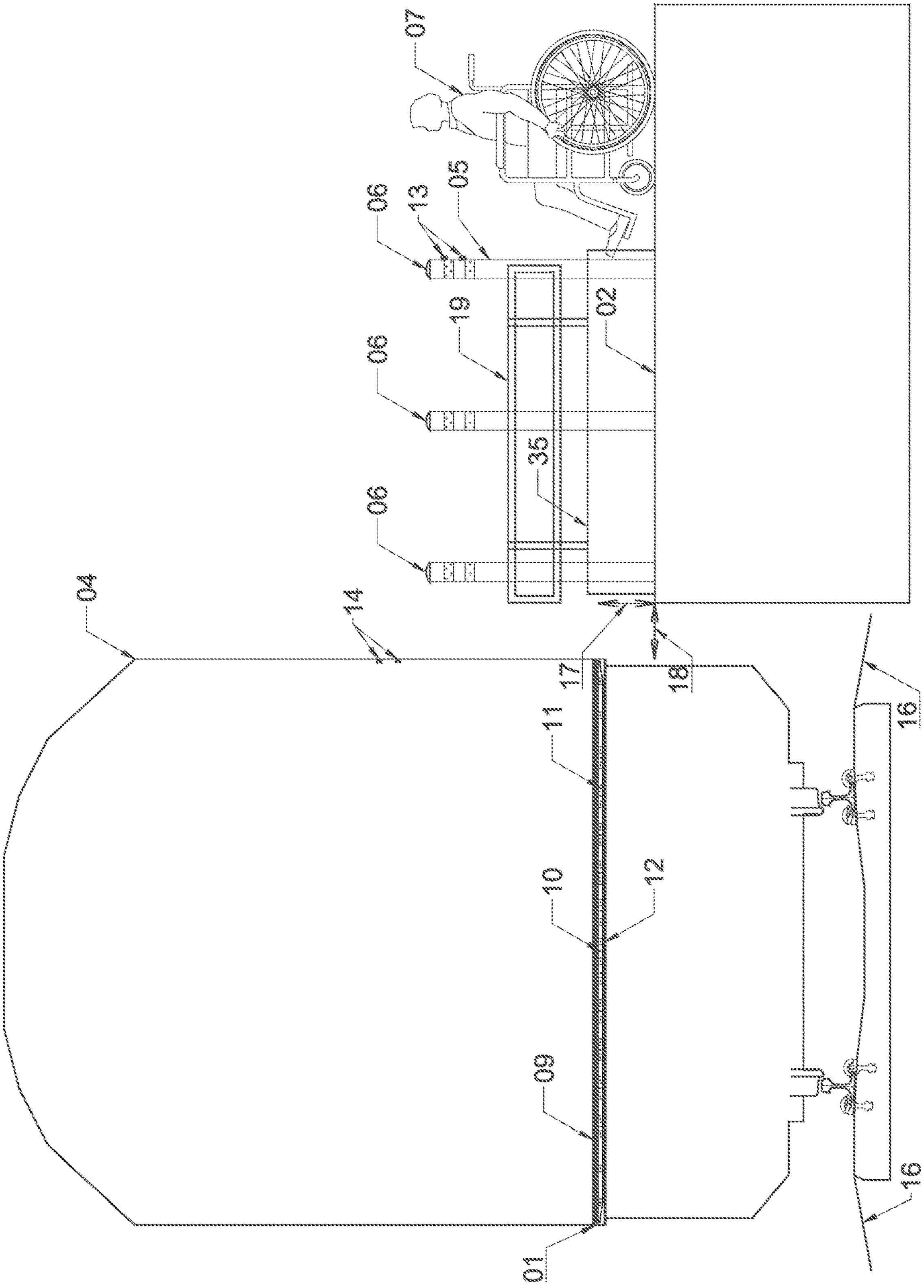

FIG. 3: Side view of the D-MAR on "stand-by" position (ramp not in use).

Figure 4:
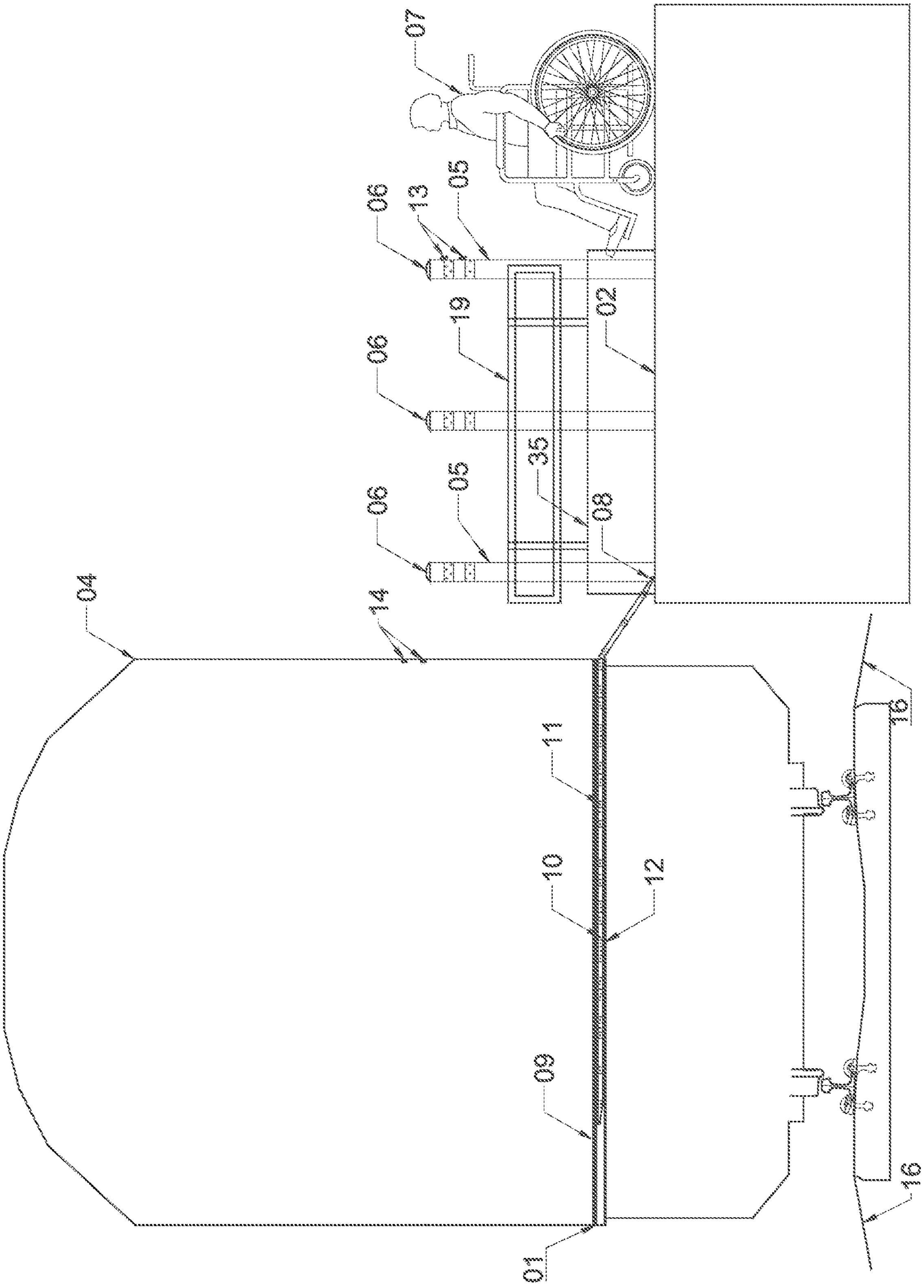

FIG. 4: Side view of the D-MAR, partially deployed (1st Phase), up to the 2$^{nd}$ hinged joint of the sliding ramp and the "nose" of the sliding ramp reaching the station platform.

Figure 5:
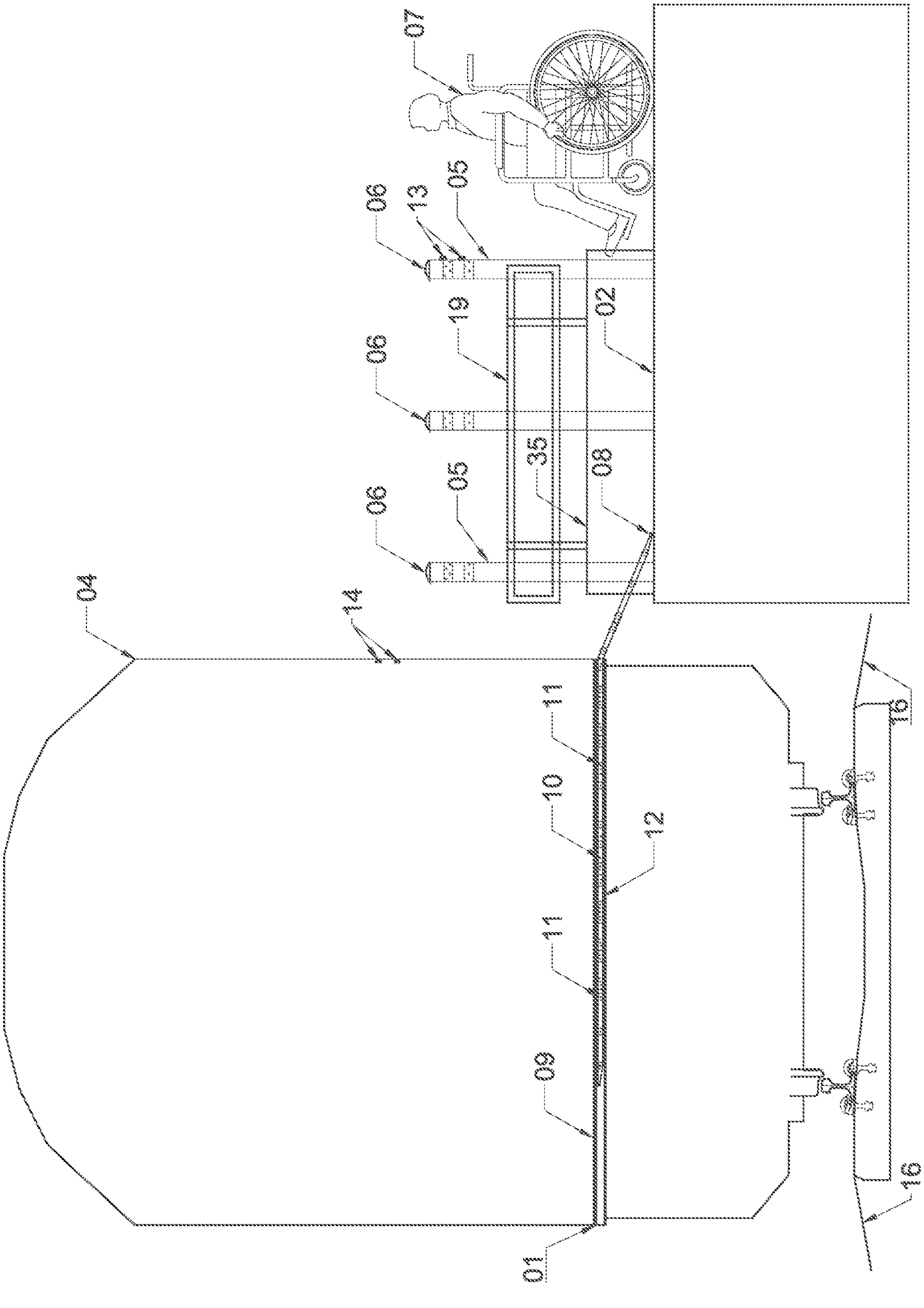

FIG. 5: Side view of the D-MAR, partially deployed (2nd Phase), up to the 3$^{rd}$ hinged joint of the sliding ramp and the "nose" of the sliding ramp continuing to roll on the station platform.

Figure 6:
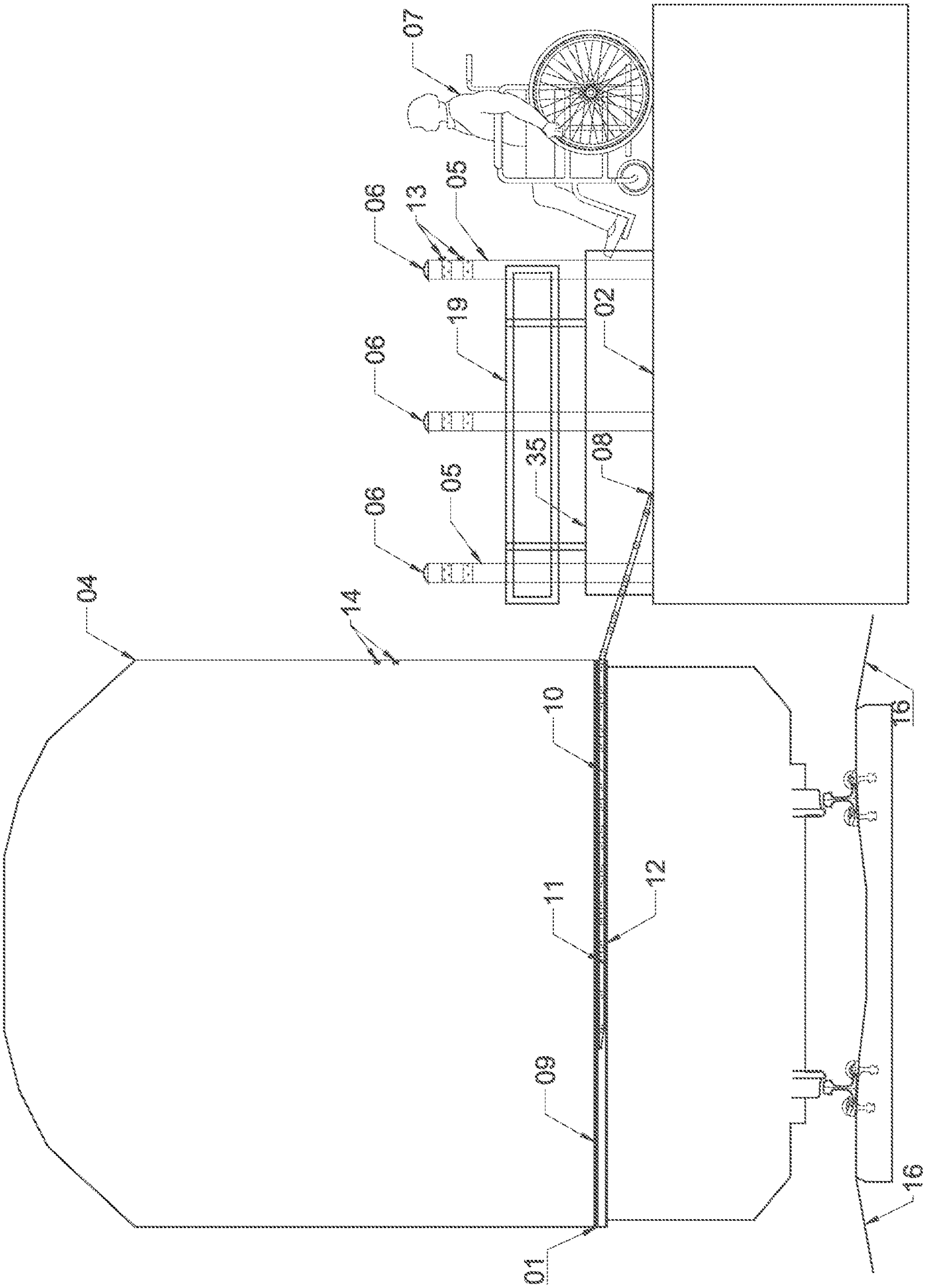

FIG. 6: Side view of the D-MAR, partially deployed (3rd Phase), up to the 4$^{th}$ hinged joint of the sliding ramp and the "nose" of the sliding ramp continuing to roll on the station platform.

Figure 7:
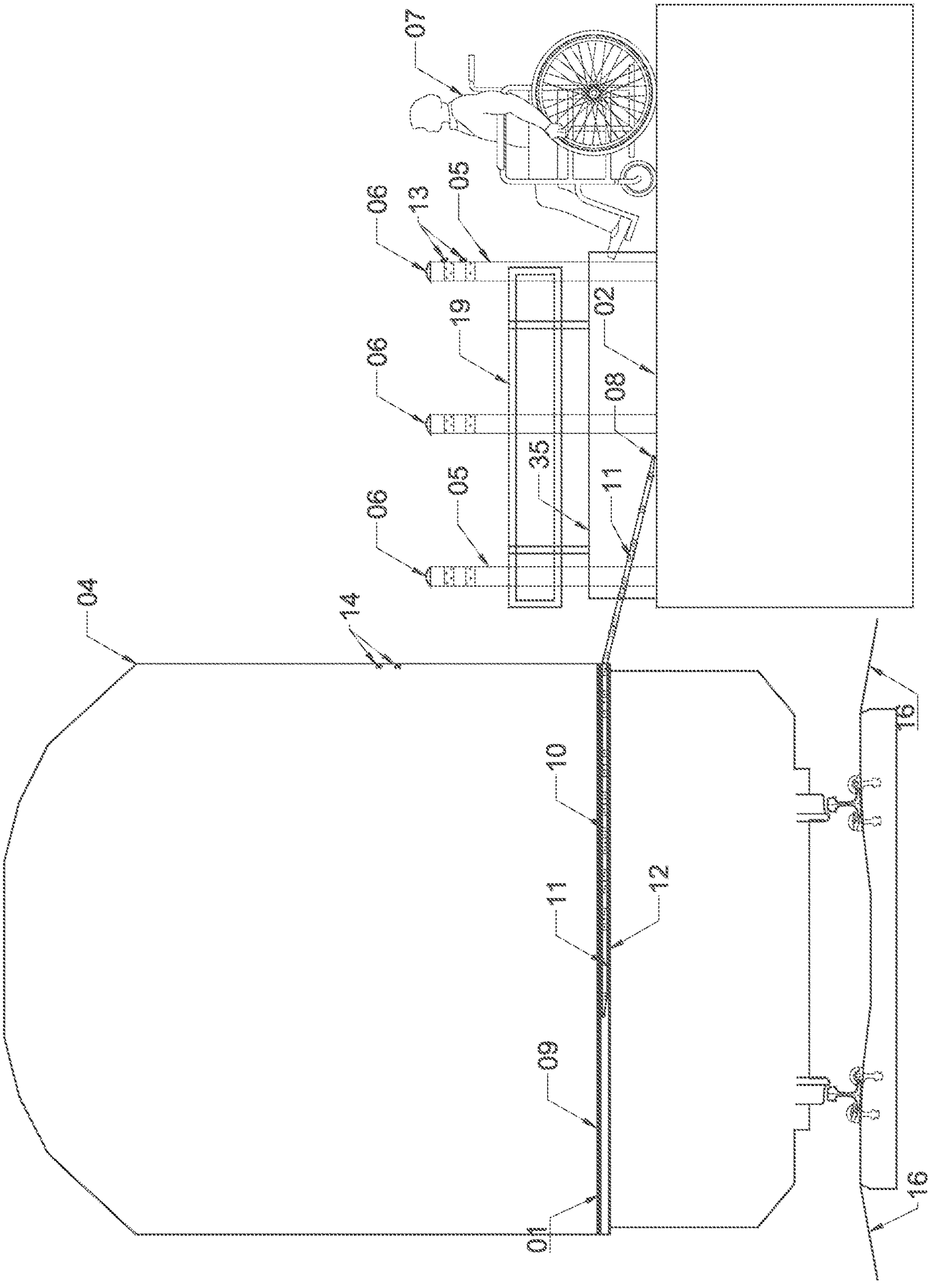

FIG. 7: Side view of the D-MAR, partially deployed (4th Phase), with 5$^{th}$ hinged joint of the sliding ramp and the "nose" of the sliding ramp continuing to roll on the station platform.

Figure 8:
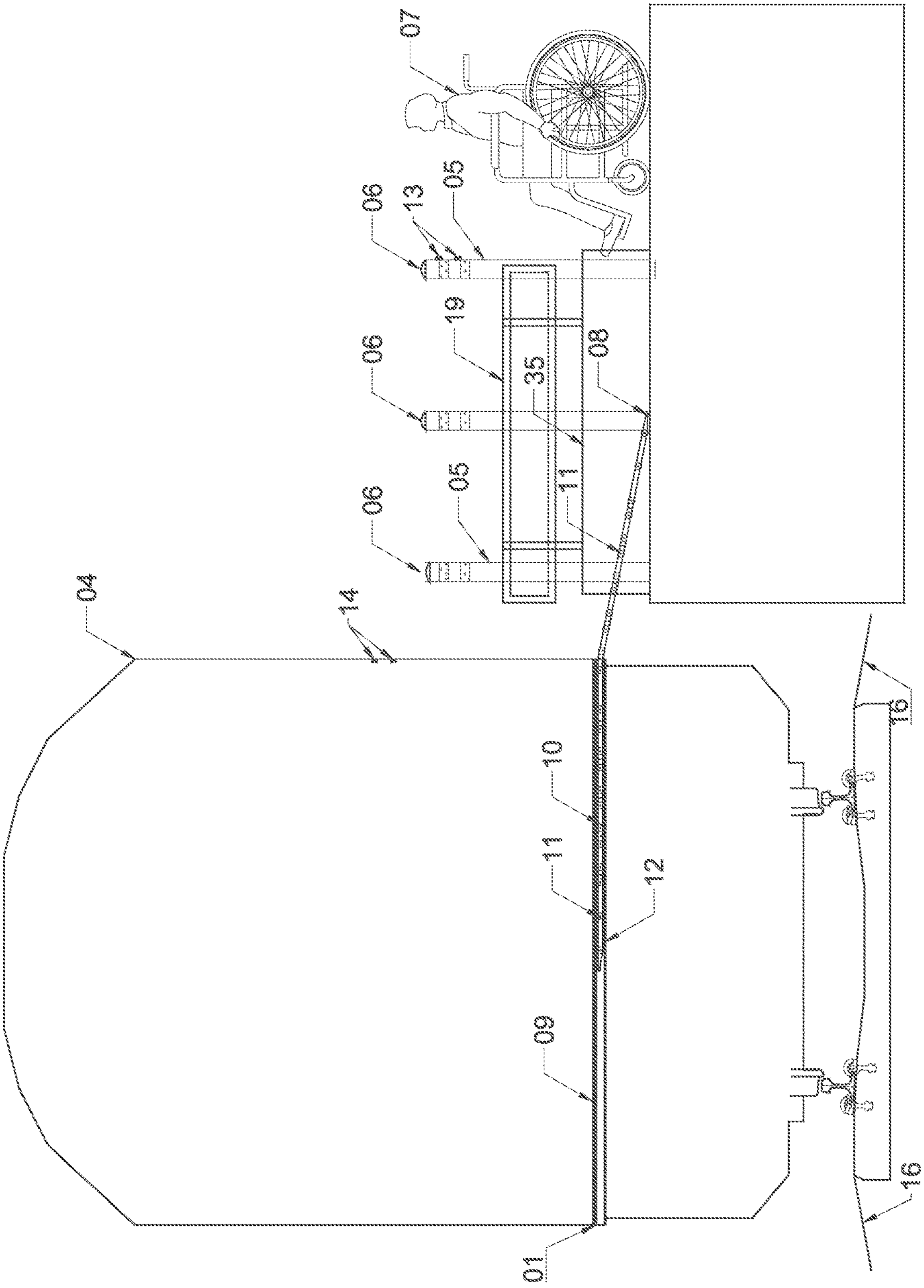

FIG. 8: Side view of the D-MAR, with the sliding ramp fully deployed (5$^{th}$ Phase), up to the 6$^{th}$ hinged joint of the sliding ramp.

Figure 9:
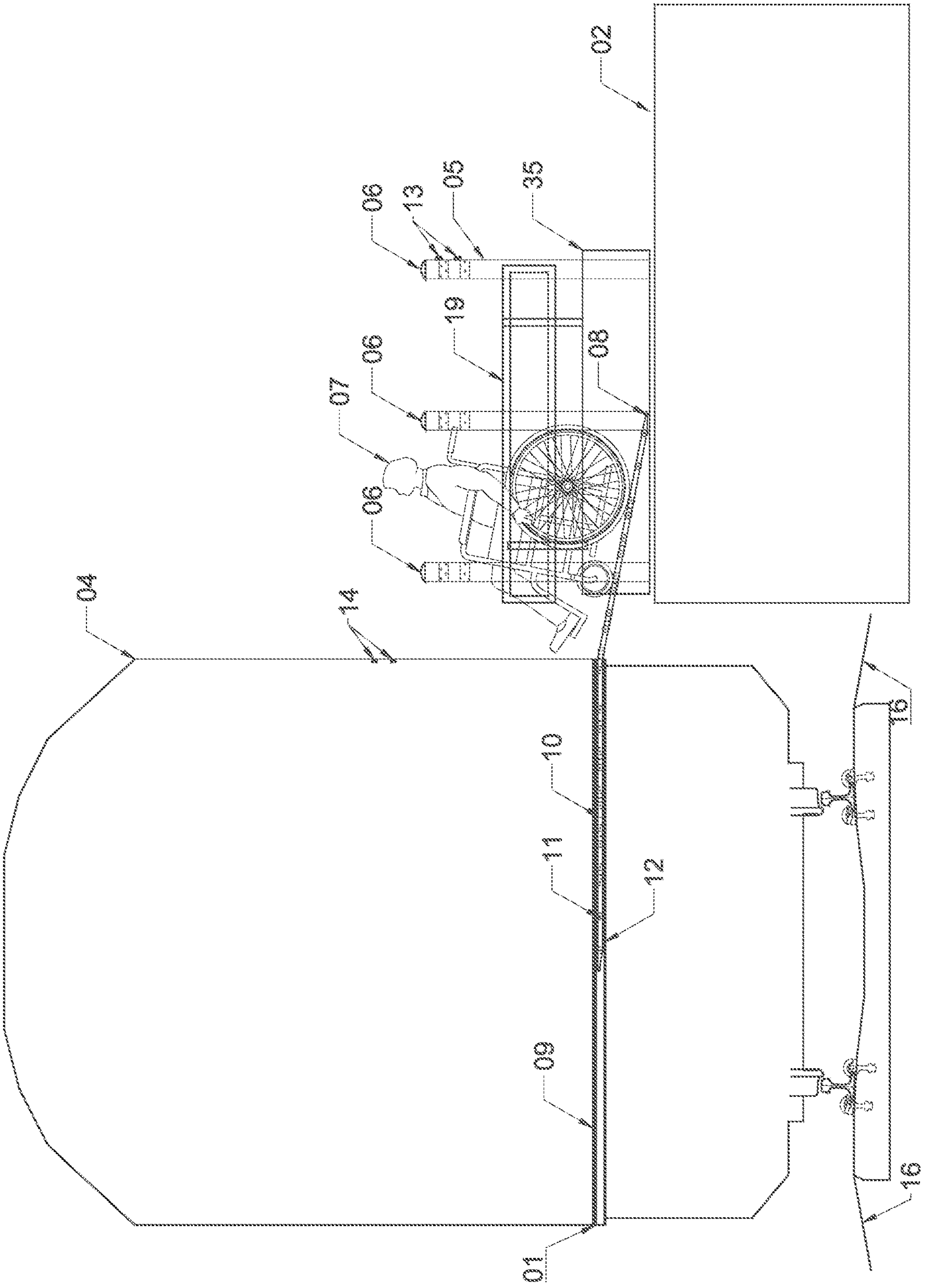

FIG. 9: Side View of fully deployed D-MAR, used by a disabled person to embark the train.

Figure 10:
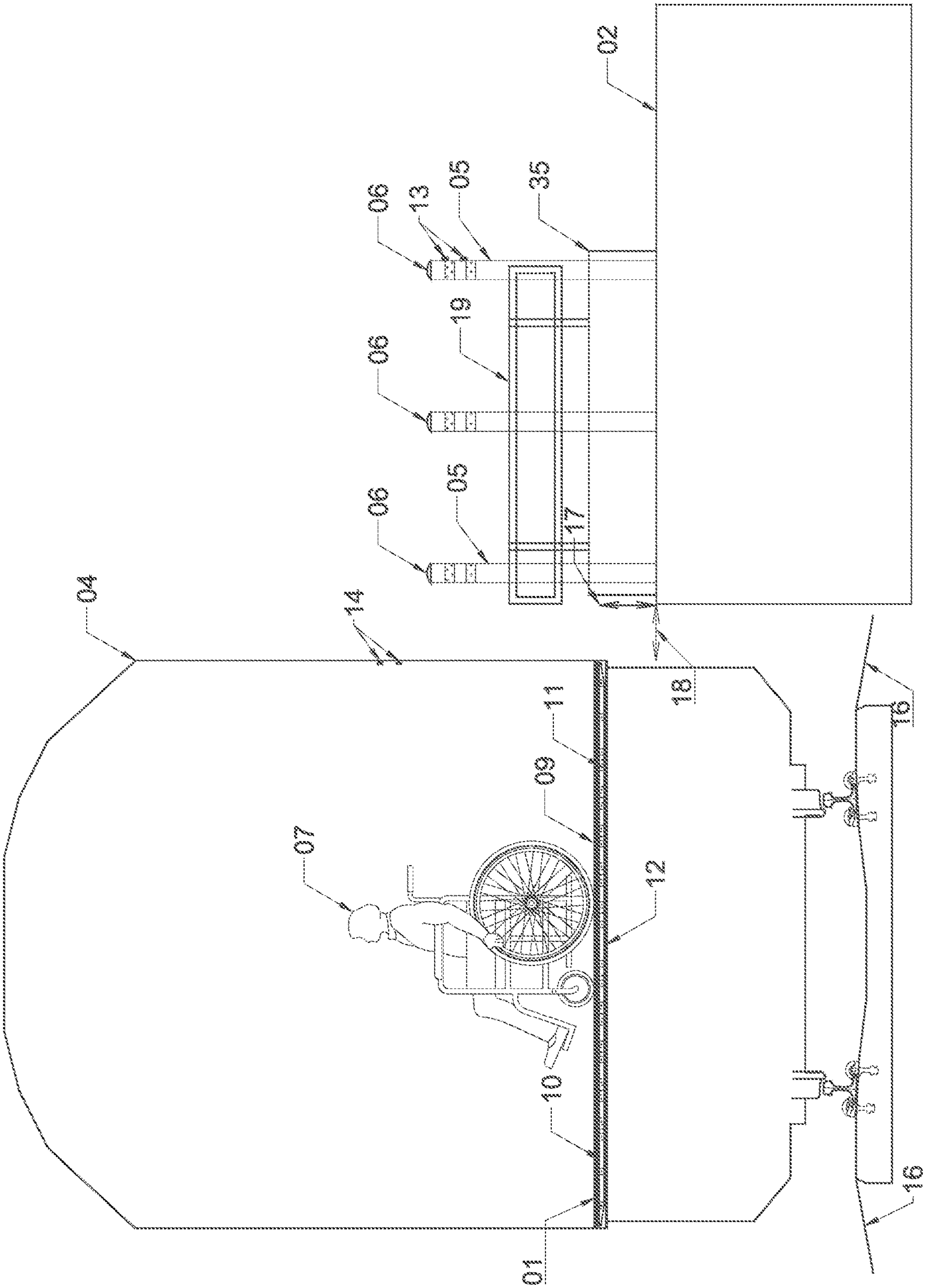

FIG. 10: Disabled person on the train floor and D-MAR returned to Stand-by position.

Figure 11:
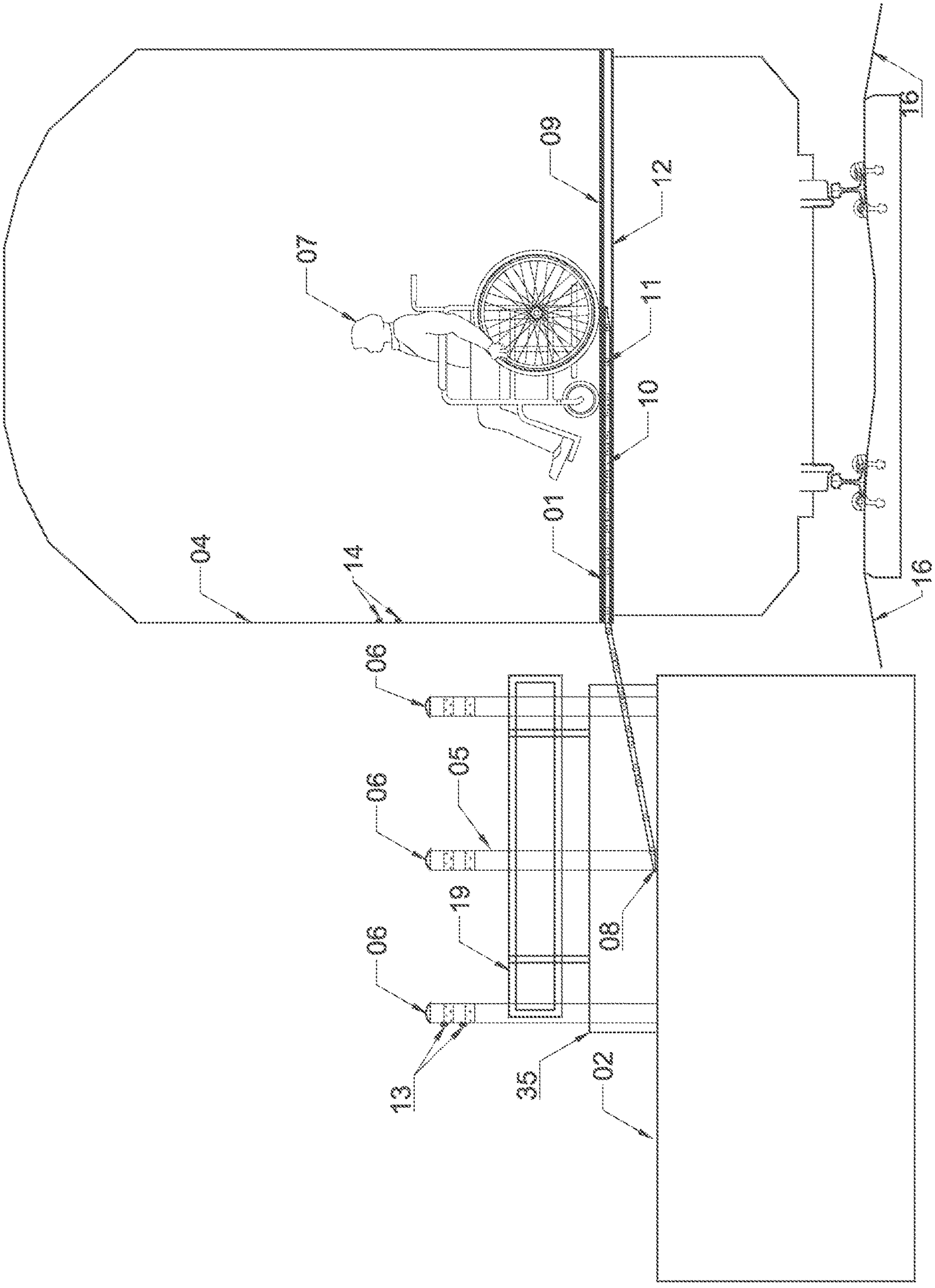

FIG. 11: D-MAR fully deployed on the left side of the train.

Figure 12:
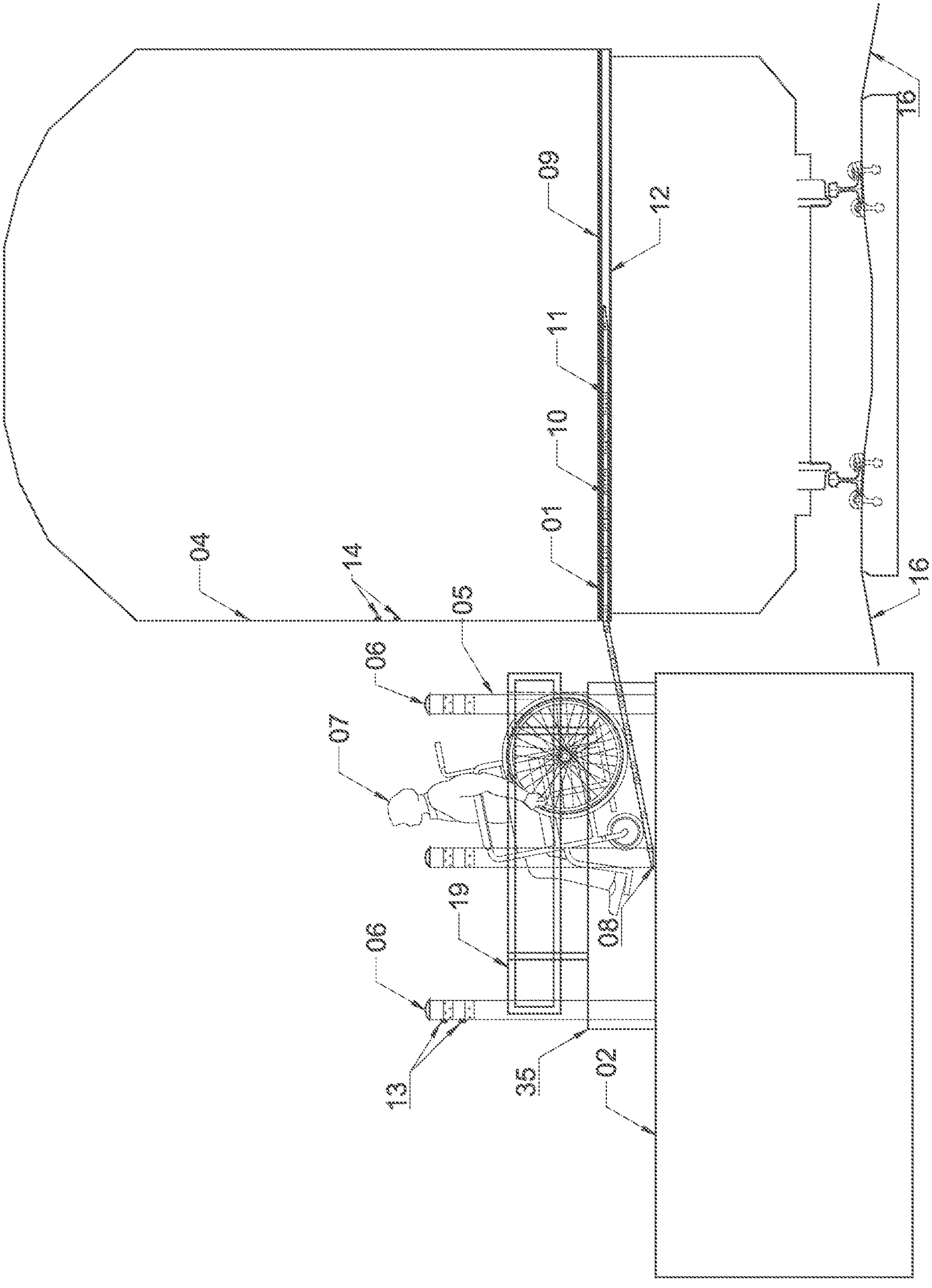

FIG. 12: Side View of fully deployed D-MAR, used by a disabled person to disembark the train.

Figure 13:
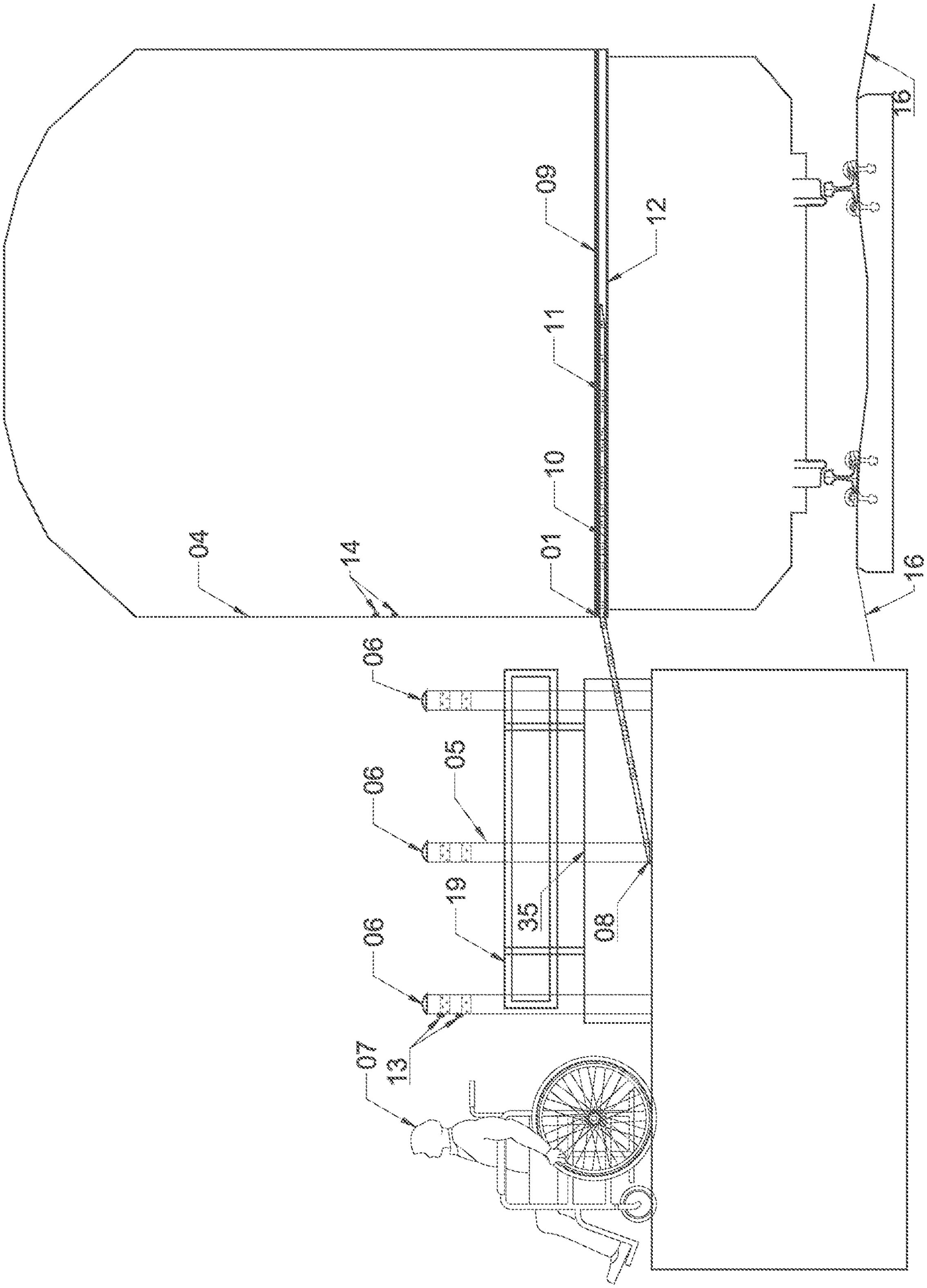

FIG. 13: Disabled person on wheel chair reaching the station platform using the D-MAR.

Figure 14:
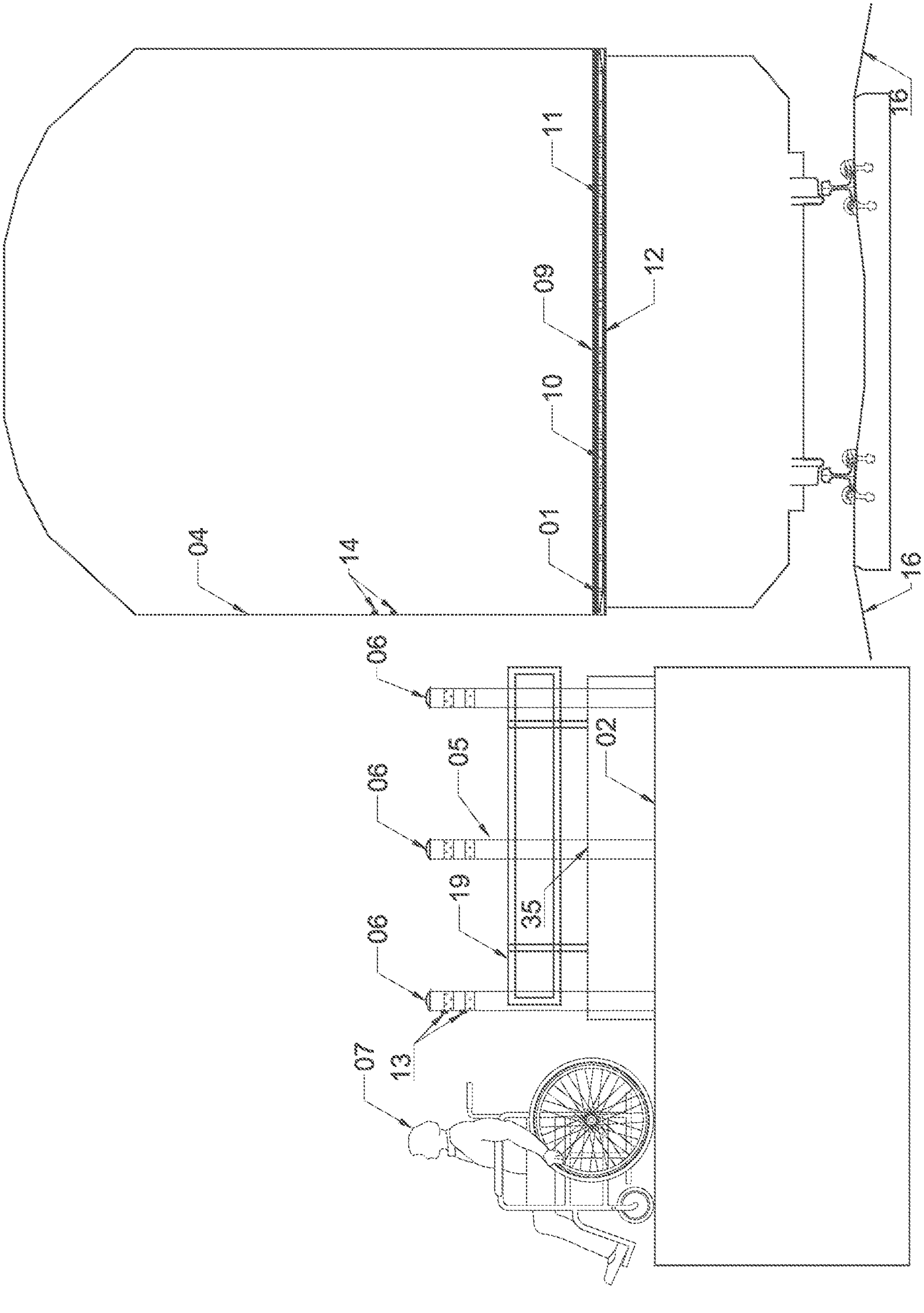

FIG. 14: D-MAR returned to Stand-by position.

Figure 15:
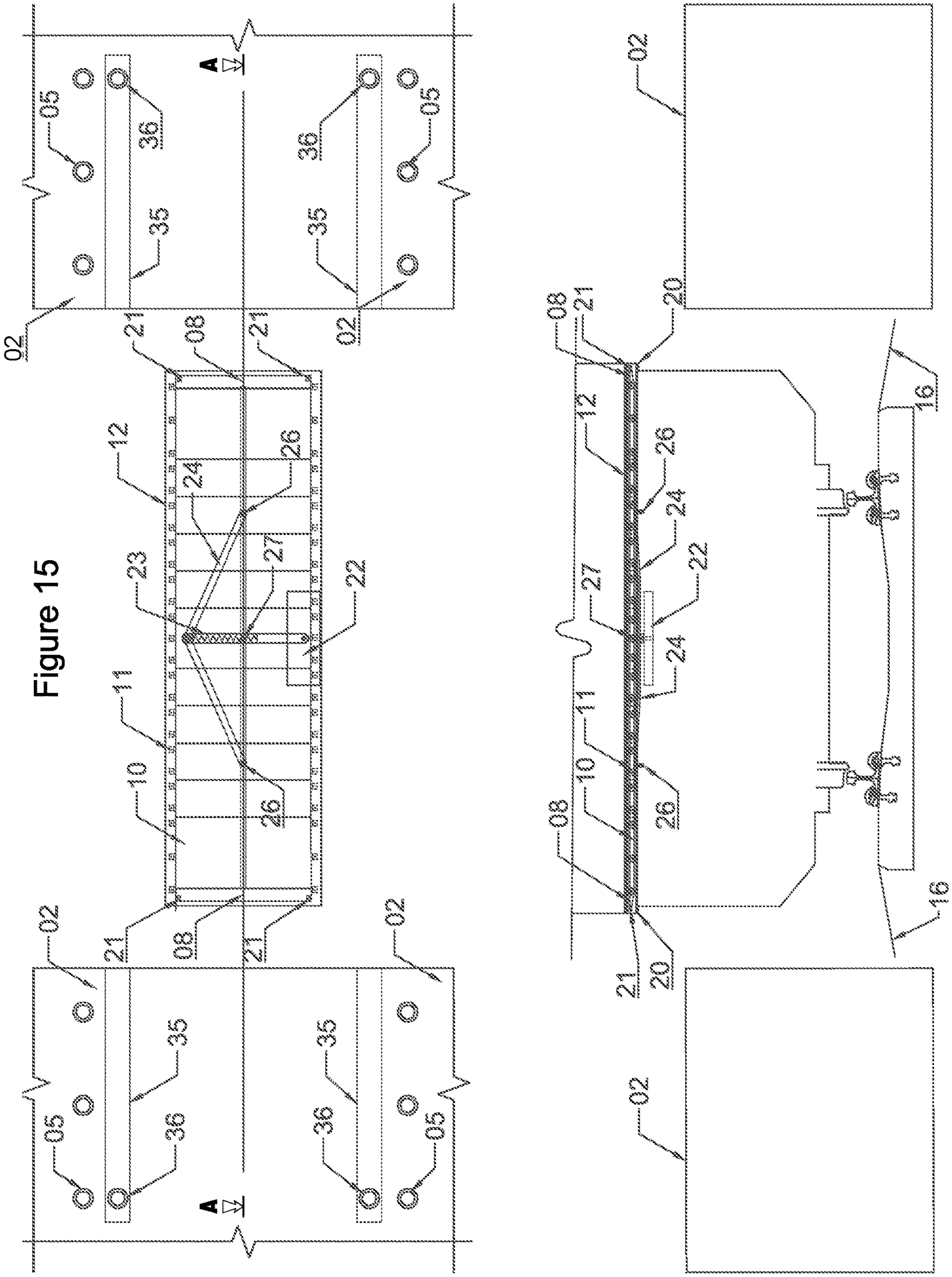

FIG. 15: D-MAR, using Swing System, Ramp on Stand-by position—Plan View and Cross Section.

Figure 16:
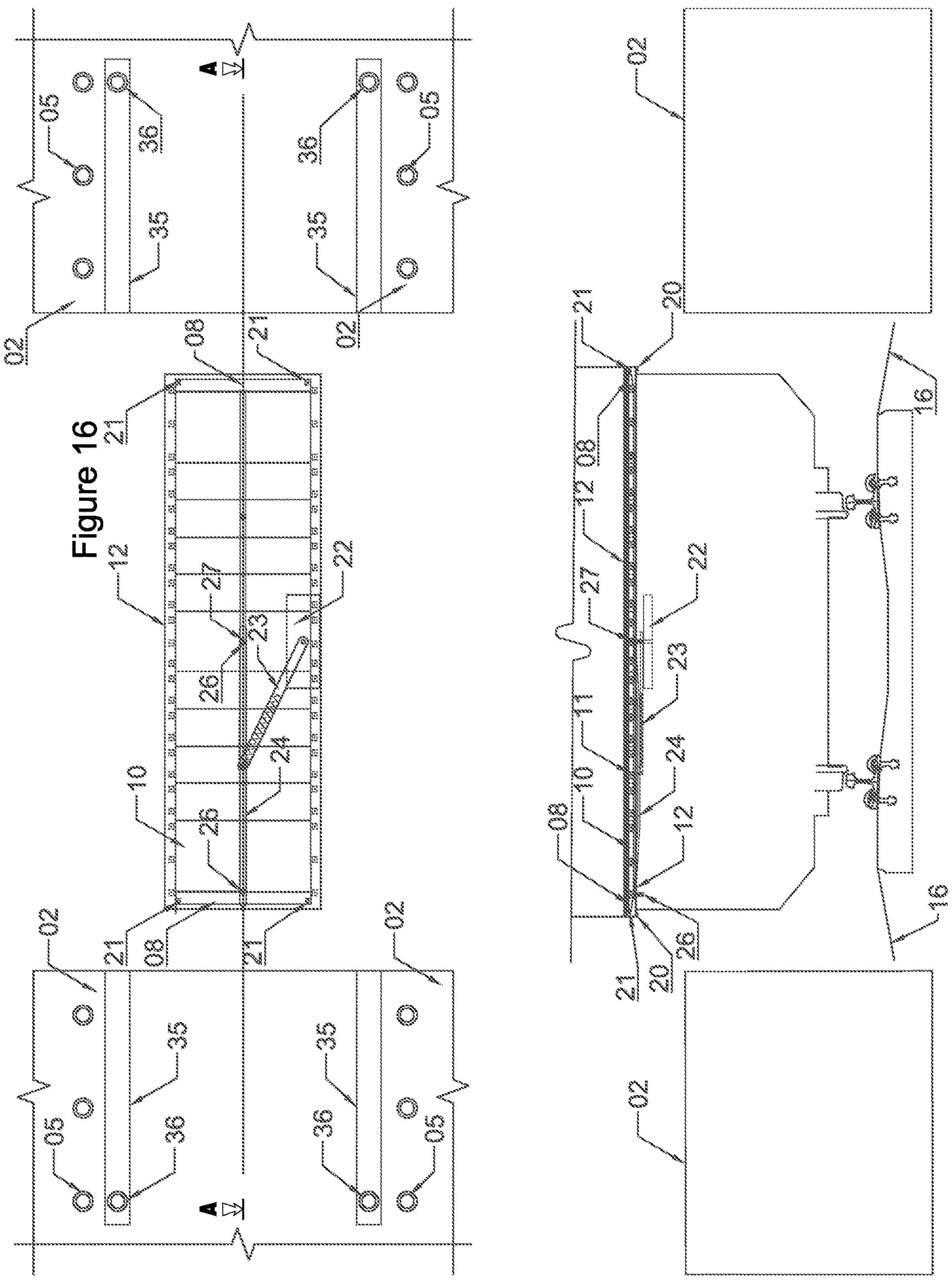

FIG. 16: D-MAR, using Swing System, Swing System fully deployed to the left side of the train (on intermediate position), Ramp still on Stand-by position—Plan View and Cross Section.

Figure 17:
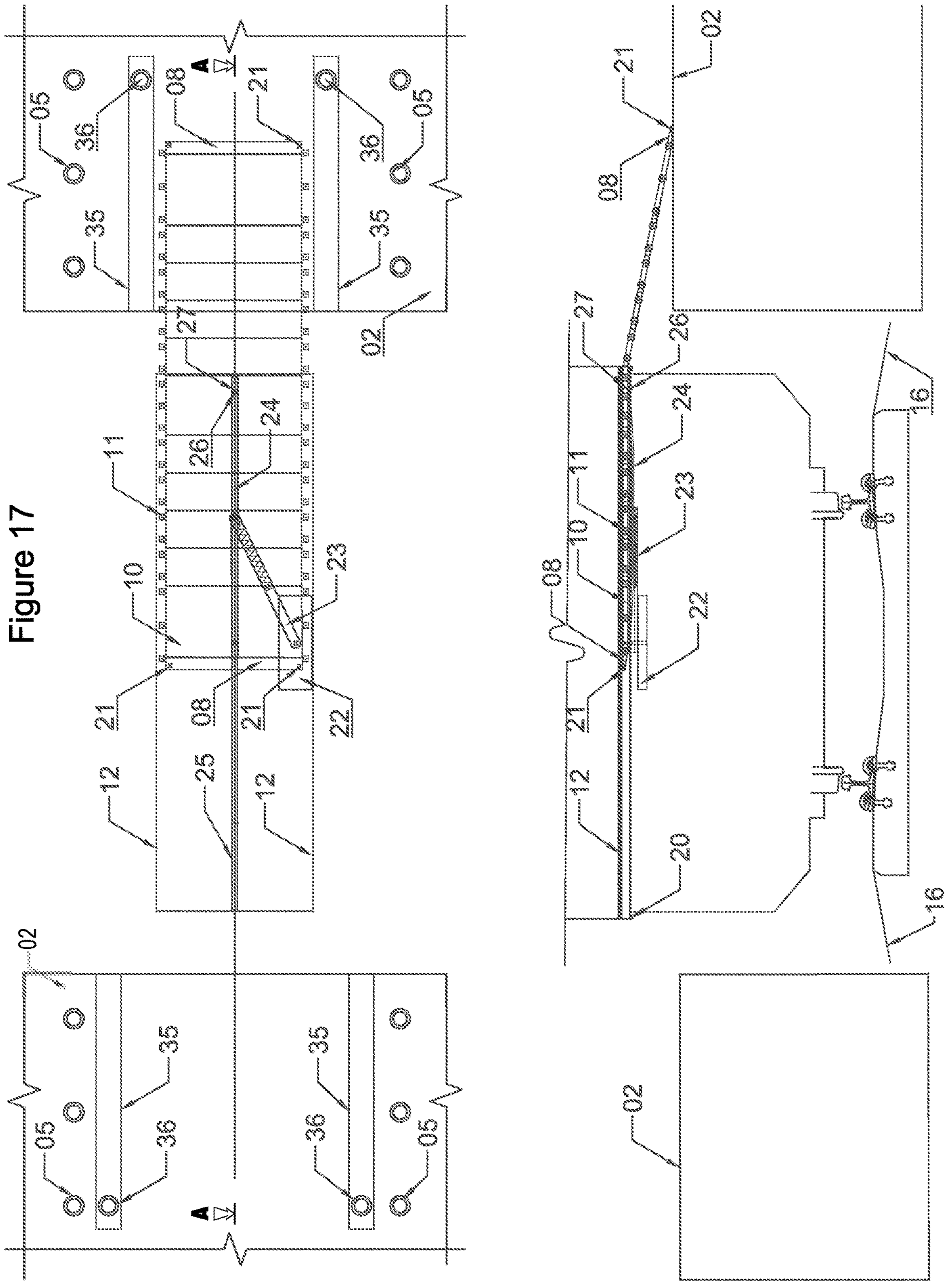

FIG. 17: D-MAR, using Swing System, Ramp fully deployed to the right side of the train—Plan View and Cross Section.

Figure 18:
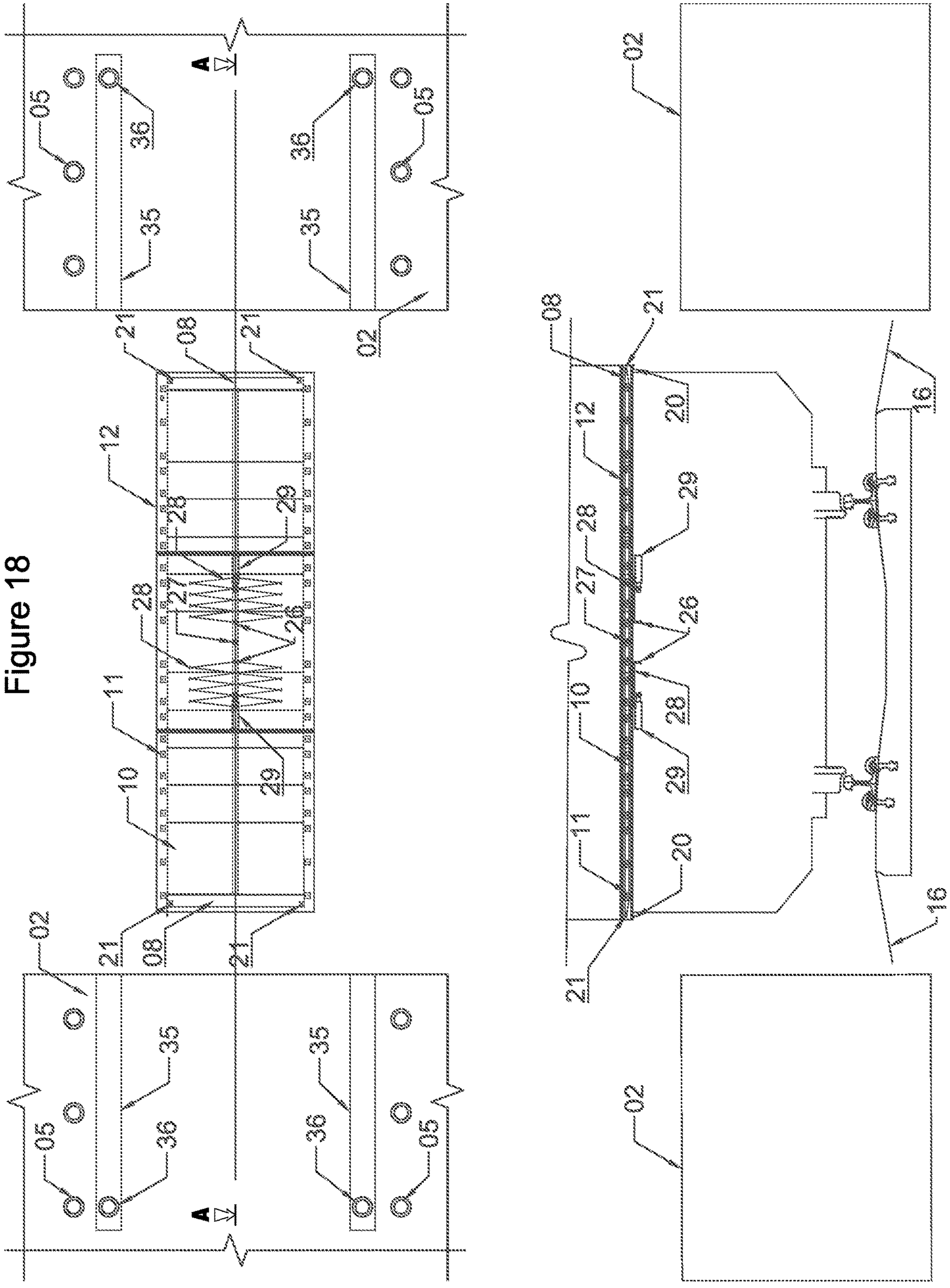

FIG. 18: D-MAR, using Scissors and Jack System, Ramp on Stand-by position—Plan View and Cross Section.

Figure 19:
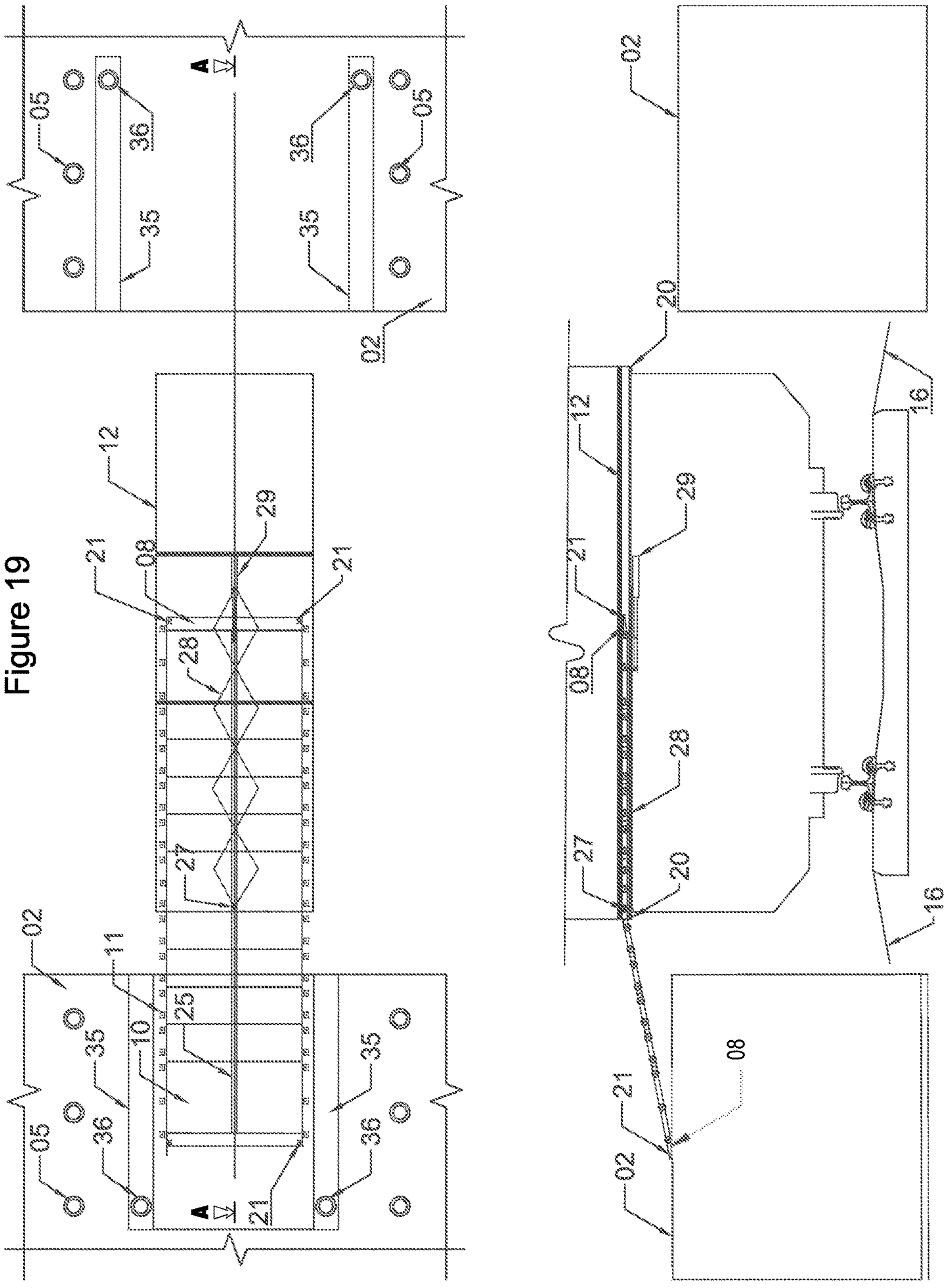

FIG. 19: D-MAR, using Scissors and Jack System, Ramp fully deployed to the left side of the train—Plan View and Cross Section FIG. 20: D-MAR, using Scissors and Jack System, Ramp fully deployed to the right side of the train—Plan View and Cross Section.

Figure 21:
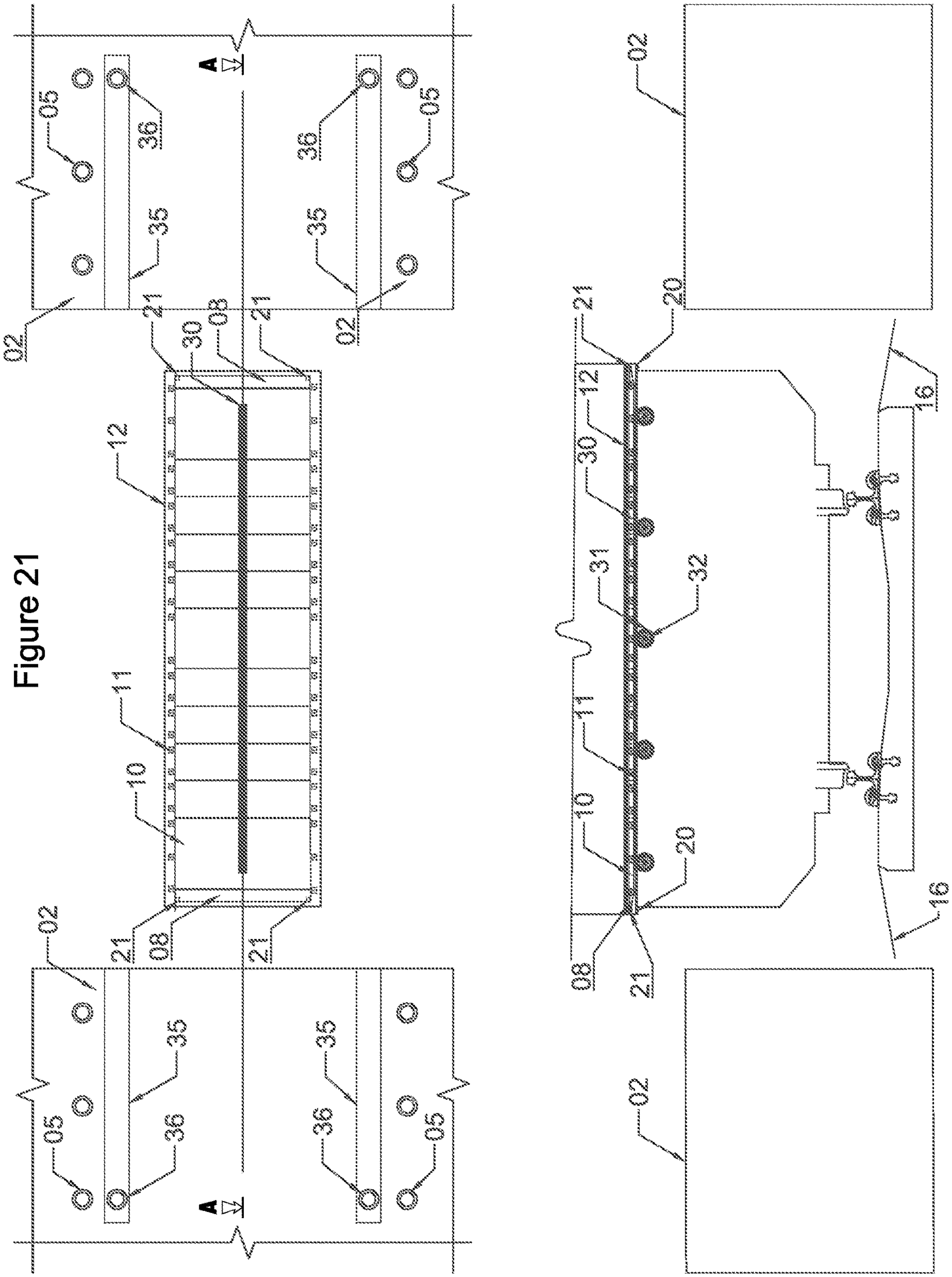

FIG. 21: D-MAR, using Rack and Pinion System, Ramp on Stand-by position—Plan View and Cross Section.

Figure 22:
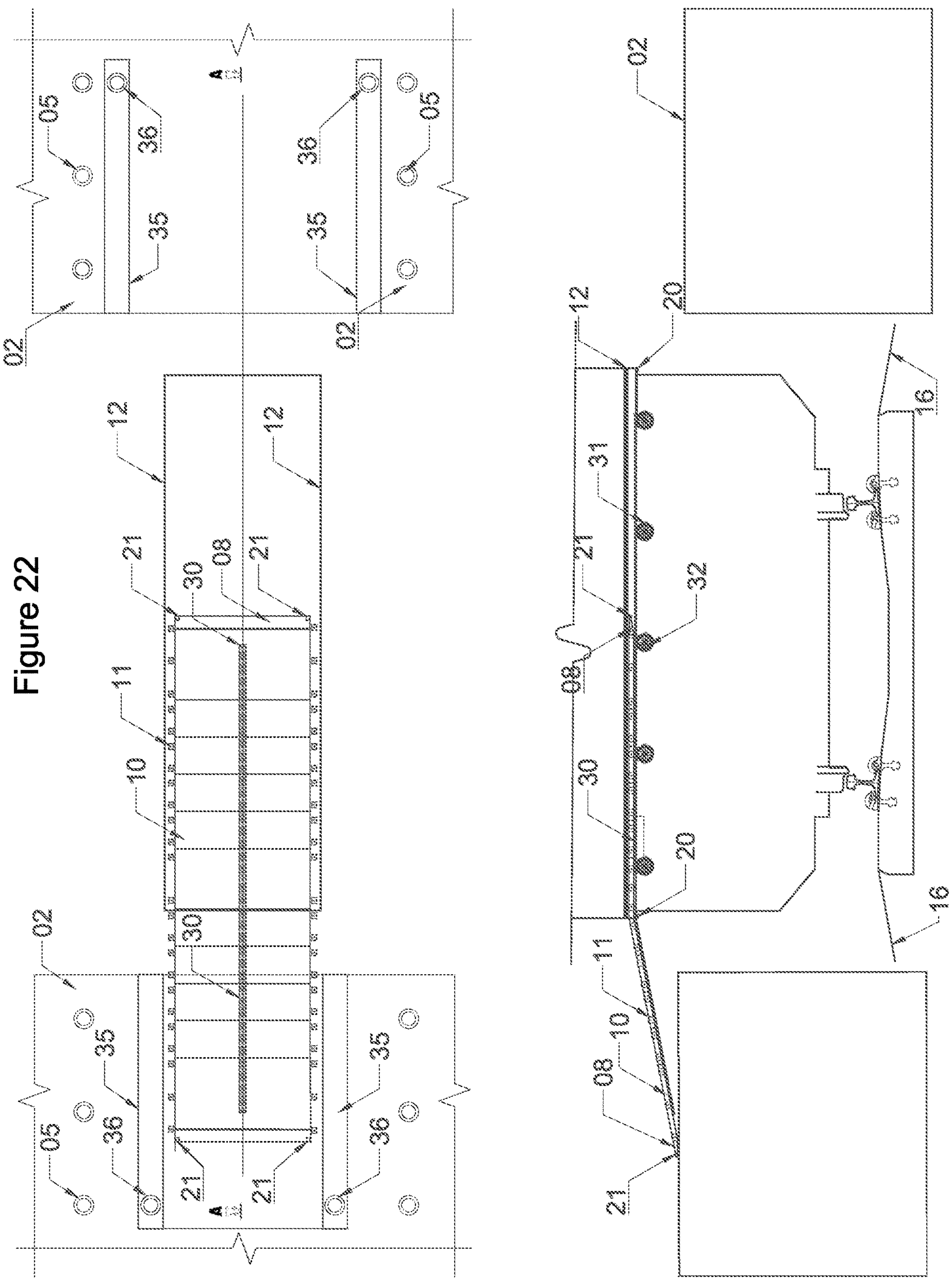

FIG. 22: D-MAR, using Rack and Pinion System, Ramp fully deployed to the left side of the train—Plan View and Cross Section.

Figure 23:
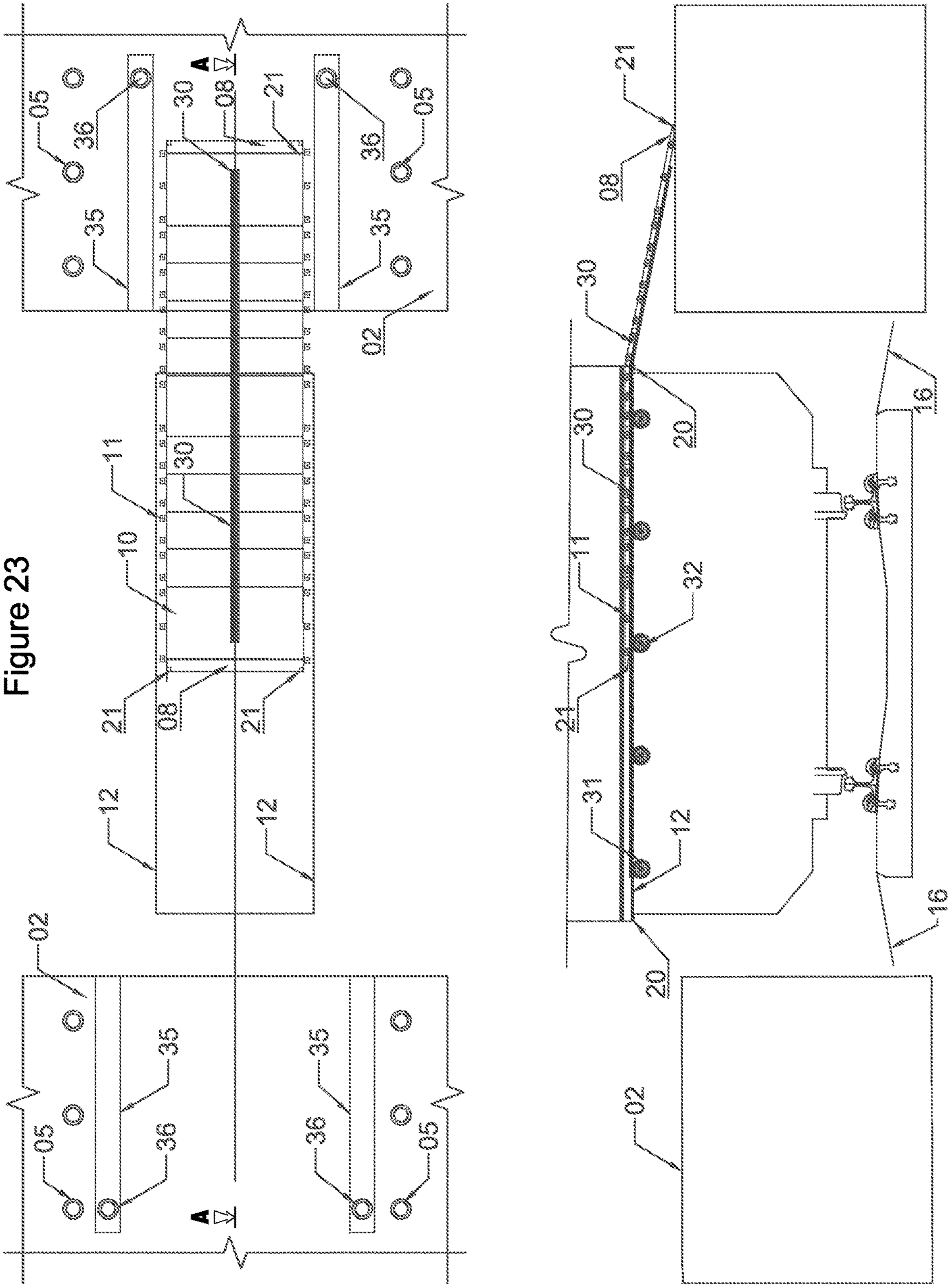

FIG. 23: D-MAR, using Rack and Pinion System, Ramp fully deployed to the right side of the train—Plan View and Cross Section.

Figure 24:
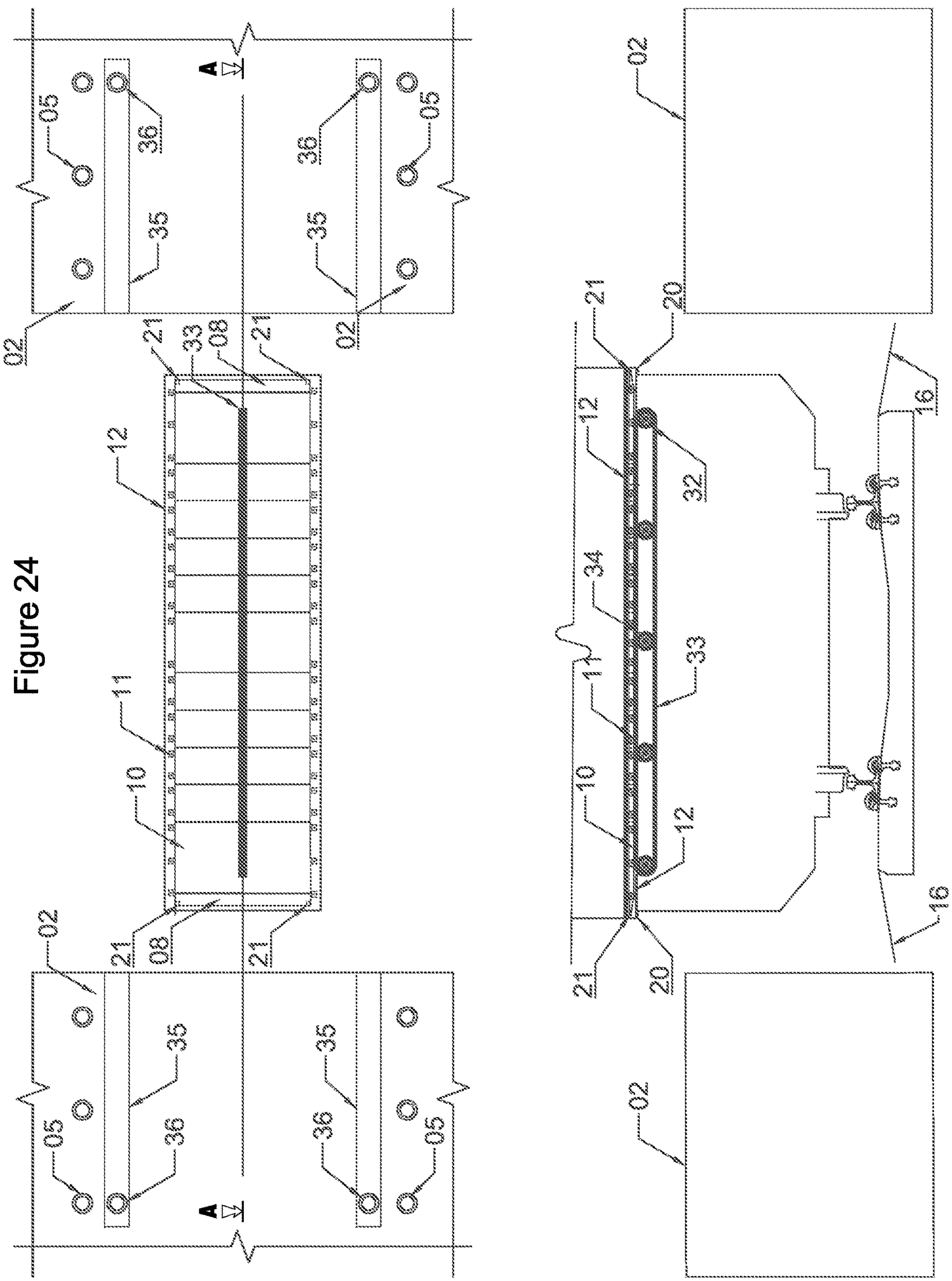

FIG. 24: D-MAR, using Teeth Belt or Chain and Pulley System, Ramp on Stand-by position—Plan View and Cross Section.

Figure 25:
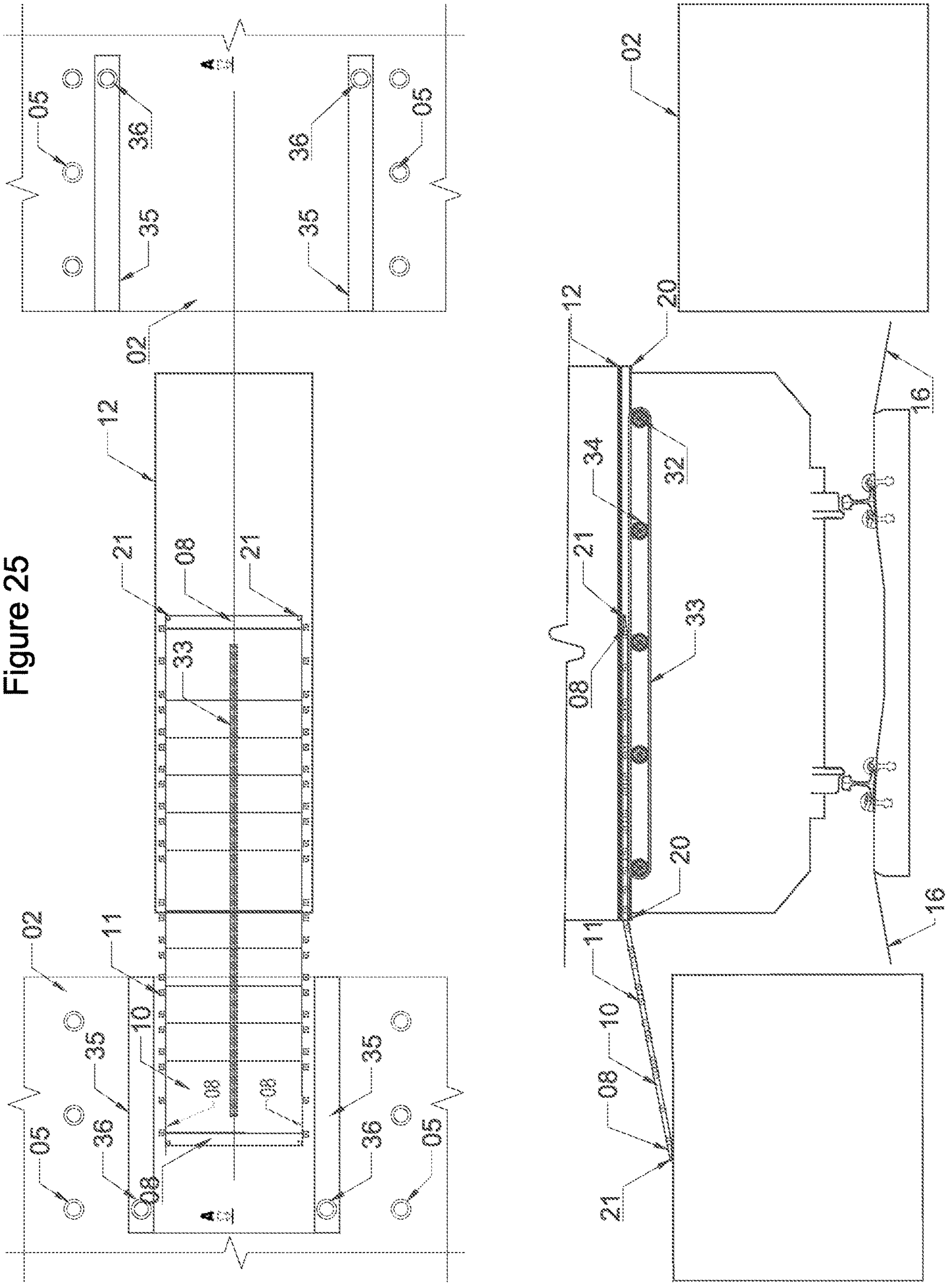

FIG. 25: D-MAR, using Teeth Belt or Chain and Pulley System, Ramp fully deployed to the left side of the train—Plan View and Cross Section.

Figure 26:
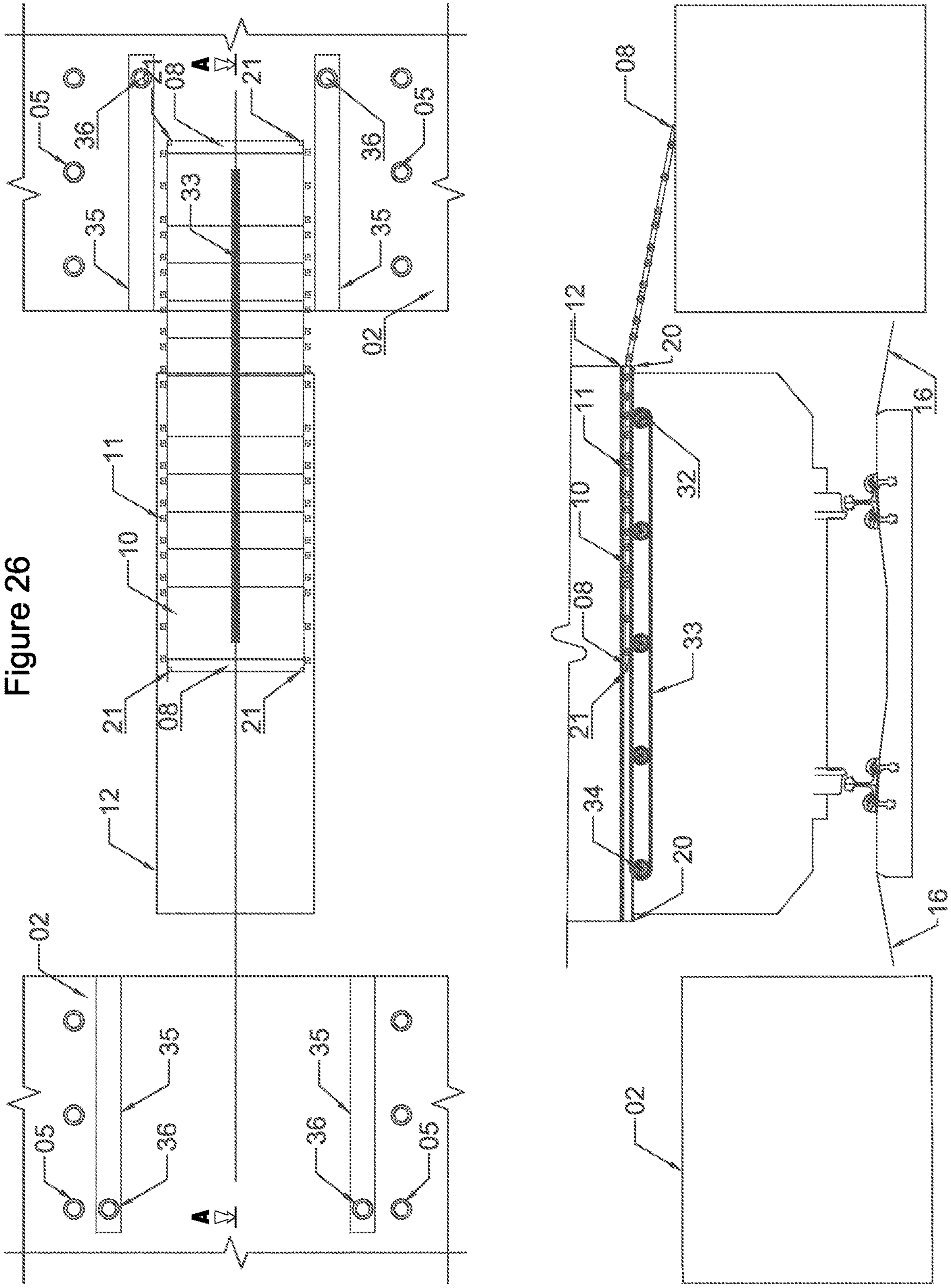

FIG. 26: D-MAR, using Teeth Belt or Chain and Pulley System, Ramp fully deployed to the right side of the train—Plan View and Cross Section.

DESCRIPTION OF SPECIFIC EMBODIMENTS OF THE INVENTION

With reference to FIG. 1, there is illustrated a General Plan View of a part of a Train Station platform (02), with the Passengers Train (04) stopped at a Platform (02).

The Platform (02) has provisions for Boarding Assistance Zones (03).

A Disabled Person on a Wheelchair (07) is shown approaching the Boarding Assistance Zone (03), with the intention to gain access to the Passengers Train (04).

The Boarding Assistance Zone (03) is provided to receive a Descending Mechanised Access Ramp (D-MAR) (01) described below.

With reference to FIG. 2, there is illustrated a Plan View of the Platform (02) with more details of the Boarding Assistance Zone (03) provided to receive a D-MAR (01).

With reference to FIGS. 3 to 14, the Descending Mechanised Access Ramp (D-MAR) system is exemplified including a substantially planar casing box (12) which is mountable to or embedded within the floor of the train (09) and a hinged jointed sliding ramp (10) which is installed inside the substantially planar casing box (12). The hinged jointed sliding ramp (10) further includes a plurality of side wheels (11) which are adapted to allow the hinged jointed sliding ramp (10) to be slidably moveable inside the substantially planar casing box (12). A remote controlled deployment mechanism (not shown) is configured to automatically deploy the hinged jointed sliding ramp (10) between a stand-by position (as shown in FIG. 03) to a fully deployed position (as shown in FIG. 08). There is provided at least two mobile protection walls (35) which are positioned on the station platform (02). The at least two mobile protection walls (35) further include tactile push buttons (13) that are adapted to trigger flashing lights (06) installed on top of the at least two mobile protection walls (35) to activate the remote controlled deployment mechanism of the D-MAR.

A Mobile Protection Wall (35), comprise a Handrail (19), at least one Bollard (36) and a Wheelchair Kerb (37) is installed on each side of the Boarding Assistance Zone (03), in order to facilitate the access of Disabled Persons on Wheelchairs (07) to the Train (04) and to provide maximum protection to all commuters while using the D-MAR (01).

At least two Safety Bollards (05) are also installed on each side of the Boarding Assistance Zone (03), bolted on the Platform (02), in order to localise and in the same time to operate the D-MAR (01).

Signage and other Wayfinding facilities will be customised on each train station, in conjunction with Stakeholders' requirements, in order to localise the Boarding Assistance Zones (03).

The Disabled Person on Wheelchair (07) is situated on the Boarding Assistance Zone (03), ready to use the D-MAR (01), with the intention to access to the Train Floor (09).

With reference to FIG. 3, it is illustrated the side view of the D-MAR (01) on stand-by position (when the ramp is not in use).

The Safety Bollards (05) are equipped with switches such as tactile push buttons (13). The tactile push buttons (13) may take a number of forms, ranging from flick switches to spring loaded push switches or snap dome switches. It will be appreciated that it is desirable for the tactile push buttons to be waterproof, such as IP66 rated switches, given the use of the buttons in an outdoor environment. In other embodiments, the tactile push buttons (13) may be replaced by touchless sensors such as motion sensors to avoid contact with high touch surfaces. The tactile push buttons (13) will trigger the Flashing Lights (06) and inform the train driver about the request to use the D-MAR (01) to access to the Passengers Train (04).

The D-MAR (01) is activated as soon as the train doors are fully open. The use of a sensor that is adapted to determine when the doors are fully open may take the form of an optical sensor or a switch which is adapted to open or close when the doors are in their fully open position.

The components of the D-MAR are best illustrated in FIGS. 15 to 26. The main component of the D-MAR (01) is the Sliding Ramp (10).

The Sliding Ramp (10) is equipped with a necessary number of Side Wheels (11), which will facilitate the Sliding Ramp (10) to skate inside the Casing Box (12). The Side Wheels (11) ideally include ball bearing races to provide reliable long term operation for the Side Wheels (11). The Side Wheels (11) may be made from a nylon material or metallic material, providing longer life.

With reference to FIG. 4, it is illustrated a side view of the D-MAR (01) on the $1^{st}$ Phase of deployment, up to the $2^{nd}$ hinge of the Sliding Ramp (10), when the Nose (08) is touching the Platform (02) of the train station. As can be seen in FIGS. 4 to 8, the Sliding Ramp (10) is adapted to slide along the platform (02) on the nose edge (08) of the Sliding Ramp (10).

As illustrated in FIGS. 15 to 26, the Nose (08) of the Sliding Ramp (10) can be equipped with one or more Optical and/or Proximity Sensors (21), which, together with the movement controller, are stopping the deployment of the ramp if there is a physical or a human obstacle on the Platform (02).

The Optical and/or Proximity sensors (21) may take the form of a through beam sensor, diffuse reflective sensor or retro reflective sensor.

The Optical and Proximity Sensors (20) on the Train Floor (09) and the Optical and Proximity Sensors (21) installed on the Ramp are controlling the deployment of the Sliding Ramp (10).

With reference to the FIG. 5, it is illustrated a side view of the D-MAR (01) on the $2^{nd}$ Phase of deployment, up to the $3^{rd}$ hinge of the Sliding Ramp (10), where the Nose (08) continues to roll on the Platform (02).

With reference to the FIG. 6, it is illustrated a side view of the D-MAR (01) on the $3^{rd}$ Phase of deployment, up to the $4^{th}$ hinge of the Sliding Ramp (10), where the Nose (08) continues to roll on the Platform (02).

With reference to the FIG. 7, it is illustrated a side view of the D-MAR (01) on the $4^{th}$ Phase of deployment, up to the $5^{th}$ hinge of the Sliding Ramp (10), where the Nose (08) continues to roll on the Platform (02).

With reference to the FIG. 8, it is illustrated a side view of the D-MAR (01) on "fully deployed" position, with the Sliding Ramp (10) deployed to its maximum length on the Station Platform (02).

The D-MAR (01) is fully covering both the Vertical Gap (17) and the Horizontal Gap (18) between the Platform (02) and the Train Floor (09), with a compliant longitudinal slope.

The Descending Mechanised Ramp D-MAR (01) is now ready to be used by a Disabled Person on Wheelchair (07) to reach the Train Floor (09) from the Platform (02).

The Descending Mechanised Ramp D-MAR (01) is also ready to be use by a Disabled Person on Wheelchair (07) to reach the Platform (02) from the Train Floor (09).

With the reference to the FIG. 9, it is illustrated the side view of the fully deployed D-MAR (01) and a Disabled Person on Wheelchair (07) using the D-MAR to access the Train Floor (09).

With the reference to the FIG. 10, it is illustrated the Disabled Person on Wheelchair (07) on the Train Floor (09), after using the D-MAR (01).

With the reference to the FIG. 11, it is illustrated the side view of the fully deployed D-MAR (01) on the left side of the train.

With the reference to the FIG. 12, it is illustrated the Disabled Person on Wheelchair (07) using the D-MAR (01) to disembark the Passenger Train (04).

With the reference to the FIG. 13, it is illustrated the Disabled Person on Wheelchair (07) reaching the Station Platform (02), after using the D-MAR (01) to disembark from the Passenger Train (04).

With the reference to the FIG. 14, it is illustrated the D-MAR (01) returned to Stand-by position.

With the reference to the FIG. 15, it is illustrated the Plan View and Cross Section of the D-MAR (01), with a Swing System as a deployment system for the Sliding Ramp (10). The D-MAR (01) is on Stand-by position.

The Swing System is composed of an Electromechanical Swing Operator (22), which is actioning a central Telescopic Swinging Arm (23) and two Elbow Arms (24), each hingedly connected to an end of Telescopic Swinging Arm (23) and to the Sliding Ramp (10).

With the reference to the FIG. 16, it is illustrated the Plan View and Cross Section of the D-MAR (01), with the Swing System fully rotated to the left, on an intermediate position, while the Sliding Ramp (10) is still on Stand-by position.

A Limit Switch (26) will enable the ends of the Elbow Arms (24) to get encroached into a Hole (27) in the middle of the Sliding Ramp (10).

The Swing System will then rotate to the right, resulting in the full deployment of the Sliding Ramp (10) to the right side of the Passengers Train (04).

With the reference to the FIG. 17, it is illustrated the Plan View and Cross Section of the D-MAR (01), with the Sliding Ramp (10) fully deployed to the right side of the train.

With the reference to the FIG. 18, it is illustrated the Plan View and Cross Section of the D-MAR (01), with a Scissors System as a deployment system for the Sliding Ramp (10). The D-MAR (01) is on Stand-by position.

The Scissors System is composed of a Scissors Type Structure (28), deployed by an Electric or Hydraulic Jack (29).

With the reference to the FIG. 19, it is illustrated the Plan View and Cross Section of the D-MAR (01), with Scissors System and the Sliding Ramp (10) fully deployed to the left side of the train.

Figure 20:
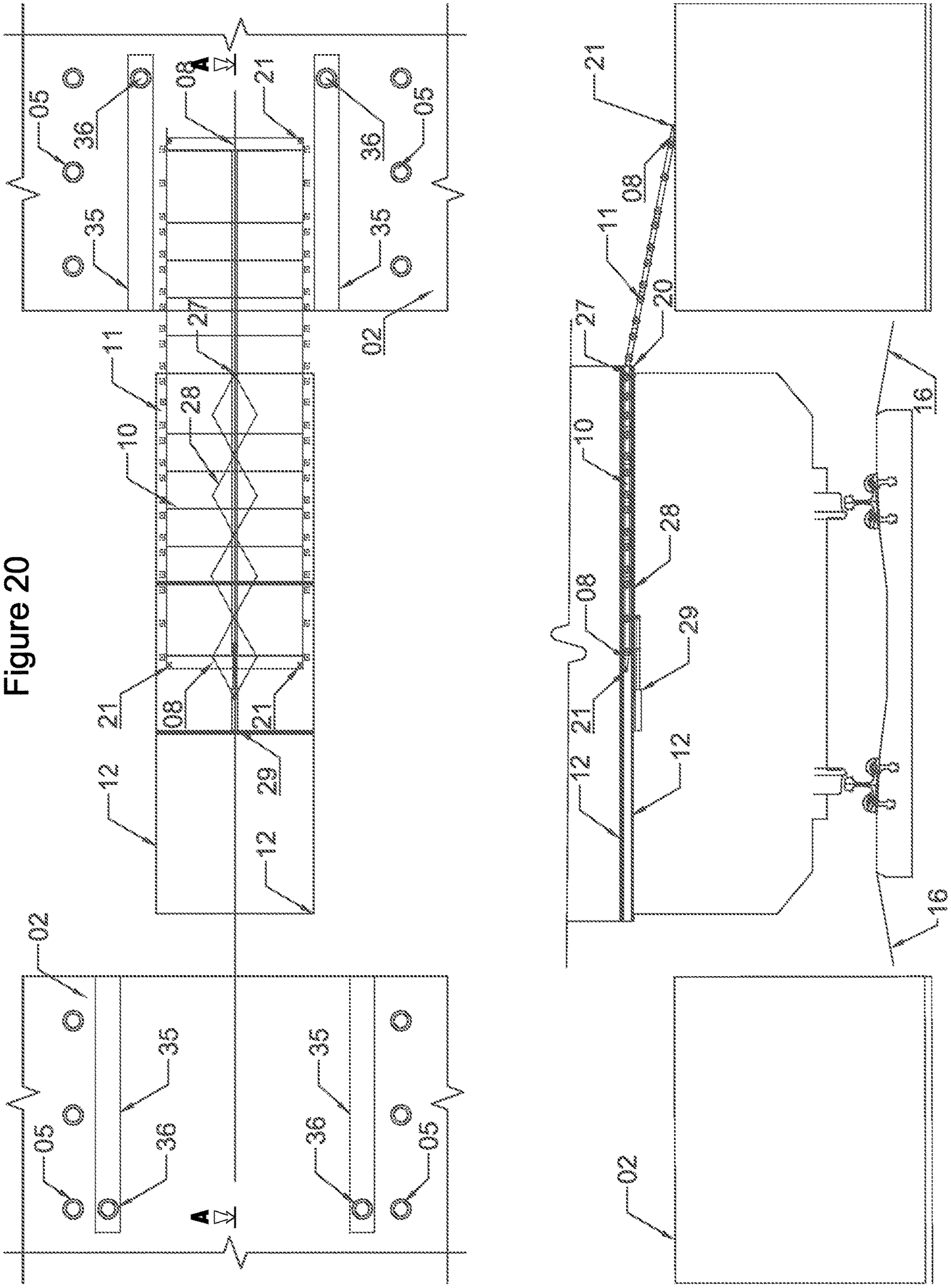

With the reference to the FIG. 20, it is illustrated the Plan View and Cross Section of the D-MAR (01), with Scissors System and the Sliding Ramp (10) fully deployed to the right side of the train.

With the reference to the FIG. 21, it is illustrated the Plan View and Cross Section of the D-MAR (01), with a Rack and Pinion System as a deployment system for the Sliding Ramp (10). The D-MAR (01) is on Stand-by position.

The Rack and Pinion System is a Standard Rack (30), attached to the Sliding Ramp (10), driven by a Pinion (31). The Pinion (31) is actioned by an Electrical Motor (32).

With the reference to the FIG. 22, it is illustrated the Plan View and Cross Section of the D-MAR (01), with Rack and Pinion System, fully deployed to the left side of the train.

With the reference to the FIG. 23, it is illustrated the Plan View and Cross Section of the D-MAR (01), with Rack and Pinion System, fully deployed to the right side of the train.

With the reference to the FIG. 24, it is illustrated the Plan View and Cross Section of the D-MAR (01), with Teeth Belt or Chain and Pulley System as a deployment system for the Sliding Ramp (10). The D-MAR (01) is on Stand-by position.

The Teeth Belt or Chain and Pulley System is composed of a typical Teeth Belt or Chain (33), attached to the central part of the Sliding Ramp (10) and actioned by a Pulley (34). The Pulley (32) is actioned by an Electrical Motor (32).

With the reference to the FIG. 25, it is illustrated the Plan View and Cross Section of the D-MAR (01), with Teeth Belt or Chain and Pulley System, fully deployed to the left side of the train.

With the reference to the FIG. 26, it is illustrated the Plan View and Cross Section of the D-MAR (01), with Teeth Belt or Chain and Pulley System, fully deployed to the right side of the train.

D-MAR Operating System

The D-MAR (01) is installed (bolted) on the Train Floor (09), during the train manufacturing process. Alternatively, the D-MAR (10) may be embedded within the train floor. In either case, an upper surface of the Casing Box (12) is flush with the floor of the train.

Alternatively, the D-MAR (01) can also be retrofitted to existing trains. In this case Small Mounted Ramps shall be installed on the sides of the D-MAR (01), to facilitate the access of wheelchairs and prams.

A Disabled Person in Wheelchair (07) arrives on the Station Platform (02) at the Boarding Assistance Zone (03) with the intention to use the D-MAR (01) to embark to the Train Floor (09), (FIGS. 01 and 02).

The Disabled Person (07) press the Tactile Push Buttons (13) on the Safety Bollards (05), which will trigger the Flashing Lights (06) and announce the train driver the request to use the D-MAR (01).

The Disabled Person on Wheelchair (07) will place themself in the Boarding Assistance Zone (03).

The D-MAR (01) can be also activated from the train by pressing the Tactile Push Buttons (14) in the Passenger Train (04).

The D-MAR (01) can be also activated by the train driver.

The D-MAR (01) can be also activated by the train guard.

The vehicle-based D-MAR activation system communicates with the platform-based system via a wireless protocol. When the wireless system is in range (such as within a few millimetres, centimetres, feet or metres) the vehicle and platform-based D-MAR components will begin communication.

If either the vehicle or platform tactile push buttons are activated, all visual activation points (Flashing Lights (06) and train driver indicator) will activate when the wireless system begins communicating. The flashing light will take the form of high intensity LED lights or incandescent lighting arrangements.

The train driver will recognise the Flashing Lights (06) and will try to stop the train as close as possible to the Car Stop mark, to ensure the D-MAR (01) is aligned with the Boarding Assistance Zone (03), (see FIG. 3).

As soon as the train doors will be completely open, the operating system of the D-MAR (01) is automatically activated. The activation of the D-MAR (01) may be controlled or triggered by the same mechanism that controls the train doors.

The D-MAR (01) can be configured to commence deployment autonomously or manually from the train driver control panel or by platform staff.

The Sliding Ramp (10) is deployed in several phases, as described on FIGS. 04, 05, 06, 07 and 08.

When the Sliding Ramp (10) is fully deployed, the two Mobile Protection Walls (35) will get tied up against the Sliding Ramp (10), in order to provide a safe embarkment to the train.

Optical and Proximity Sensors (21) on the Nose (08) of the Sliding Ramp (10) and Optical and Proximity Sensors (20) on the Train Floor (09) can be used to control the deployment of the Sliding Ramp (10).

The full deployment of the Sliding Ramp (10) takes approximately 7 seconds.

The D-MAR (01) can be now used by Disabled Persons on Wheelchairs (07) or persons with reduced mobility (see FIG. 09). The D-MAR (01) can be also used by persons with prams/strollers. The D-MAR (01) can be also used by persons with large luggage.

When the commuters' embarking and disembarking the train are completed, the return to the "stand-by" position of the Sliding Ramp (10) can be activated by:

- any person on the platform, by pressing the Tactile Push Buttons (13) on the Safety Bollards (05) or
- any person in the train, by pressing the Tactile Push Buttons (14) or
- the train guard or
- the train driver.

At this moment the two Mobile Protection Walls (35) will move away from the Sliding Ramp (10), up to their stand-by position.

The Sliding Ramp (10) will then return to the stand-by position, inside the train.

The entire cycle of the return of the Sliding Ramp (10) to the "stand-by" position will take approximately 7 seconds (see FIG. 10).

The train doors can be closed only after the Sliding Ramp (10) is fully retracted on stand-by position.

A similar process is used to activate the D-MAR from the train: the Disabled Person on Wheelchair (07) is pressing the Tactile Push Button in the Train (14) and the D-MAR (01) is deployed as previously described (see FIGS. 11, 12, 13 and 14).

G. First Preferred Embodiment

With the reference to the FIGS. 15, 16 and 17, there are illustrated Plan Views and Cross sections of the D-MAR (01) using Swing System for the deployment of the Sliding Ramp (10). The deployment of the Sliding Ramp (10) can be done on each side of the Train Floor (09).

Expected major component characteristics (indicative);

Electromechanical Swing Operator (FIG. 15, 16, 17, Part 22);

Arm Swing: +180 to −180 degrees with motion control at 1.8 degrees increments, Torque: 30 N·m, Rotational Speed: +180 to −180 degrees in 5 seconds under load;

Telescopic Swinging Arm (FIG. 15, 16, 17, Part 23); Linear travel: 1 m reversible, Thrust/Load: 1000 N, Linear Speed: 200 mm/s.

H. Second Preferred Embodiment

With the reference to the FIGS. 18, 19 and 20, there are illustrated Plan Views and Cross sections of the D-MAR (01) using Scissors and Jack System for the deployment of the Sliding Ramp (10). The deployment of the Sliding Ramp (10) can be done on each side of the Train Floor (09).

Expected major component characteristics (indicative);

Electric or Hydraulic Jack (FIG. 18, 19, 20, Part 29); Linear travel: 700 mm reversible, Thrust/Load: 5000 N, Linear Speed: 100 mm/s.

I. Third Preferred Embodiment

With the reference to the FIGS. 21, 22 and 23, there are illustrated Plan Views and Cross sections of the basic D-MAR (01) using Rack and Pinion System for the deployment of the Sliding Ramp (10). The deployment of the Sliding Ramp (10) can be done on each side of the Train Floor (09).

Expected major component characteristics (indicative);

Rack and Pinion (FIG. 21, 22, 23 Parts 30, 31), Electric Motor and Gearbox (Part 32); Motor drive type: continuous rotation, motion control at 1.8 degrees increments, continuous position feedback, forward/reverse drive action, in-built gearbox, Torque: 5000 N·m, Speed: 100 rpm.

J. Fourth Preferred Embodiment

With the reference to the FIGS. 24, 25 and 26, there are illustrated Plan Views and Cross sections of the D-MAR (01) using Teeth Belt or Chain and Pulley System for the deployment of the Sliding Ramp (10). The deployment of the Sliding Ramp (10) can be done on each side of the Train Floor (09).

Expected major component characteristics (indicative);

Teeth Belt Drive or Chain (FIG. 24, 25, Parts 33, 34), Electric Motor and Gearbox (Part 32); Motor drive type: continuous rotation, motion control at 1.8 degrees increments, continuous position feedback, forward/reverse drive action, in-built gearbox, Torque: 5000 N·m, Speed: 100 rpm.

K. Fifth Preferred Embodiment

With reference to the FIGS. 15 to 26, applicable to all Embodiments, the D-MAR (01) can be installed on all new train floors during manufacturing phase.

L. Sixth Preferred Embodiment

With reference to the FIGS. 15 to 26, applicable to all Embodiments, the D-MAR (01) can retrofit the existing trains. A Small Mounted Ramps will be installed around the Casing Box (12), in order to facilitate the access of the wheelchairs or prams.

M. Seventh Preferred Embodiment

In an alternative embodiment, there is provided a system for providing access to a vehicle (which in the figures is shown as a train). The train (4) has at least two opposing entry/exit points as is exemplified in FIGS. 15 to 26. A slidable hingeable ramp (10) is positioned between the two opposing entry/exit points of the train as is shown in FIG. 15. The two entry/exit points represent opposing doors of a train carriage. The system includes a mechanism adapted for operation of the slidable ramp in at least a plurality of configurations. The mechanism may take the form of a Rack and Pinion (FIG. 21, 22, 23 Parts 30, 31) mechanism, a Teeth Belt or Chain and Pulley System or a Scissors and Jack System as were previously discussed. The plurality of configurations includes at least:

i. a standby configuration (as shown in FIG. 16), wherein the slidable ramp is substantially positioned between the at least two opposing entry/exit points;

ii. a first entry/exit configuration (as shown in FIG. 17), wherein the slidable ramp is extended outside one of the at least two opposing entry/exit points to a first surface external to the vehicle (e.g. first station platform); and iii. a second entry/exit position (as shown in FIG. 19), wherein the slidable ramp is extended outside an opposing entry/exit point to a second surface external to the vehicle (e.g. second station platform).

N. Operation in Use

With reference to FIGS. 03 to 10, in one embodiment, a disabled person in a wheelchair (7) approaches an incoming passenger train (4) as is shown in FIG. 03. The disabled person in the wheelchair (7) notifies the train of their intention to board the incoming passenger train (4) by pressing the tactile push button (13) which is located on safety bollards (5) on the platform (2) of the train station. This action communicates wirelessly with the train (4), when the train is in range, the intention of the disabled person (7) to board the train and subsequently initiates the deployment process of extending a sliding ramp (10) onto the platform (2) to assist the disabled person to enter the train (4).

The pressing of the tactile push button (13) initiates wireless communication between the safety bollards (5) and the train (4) to initiate the action of extending the ramp onto the station platform (2) once the train door has aligned with the safety bollards (5) on the station platform (2). The deployment may be triggered or synchronised with the opening of doors of the train. This deployment action may be assisted using one or more optical and/or proximity sensors that are installed on the passenger train (4) and the nose (8) of the sliding ramp (10). The train door opens and the sliding ramp (10) extends onto the platform as is exemplified in FIGS. 04 to 08. As the sliding ramp (10) extends it slides along the platform allowing the disabled person (7) to enter the train up the safety ramp. Once the disabled person (7) has entered the train, the sliding ramp (10) is then remotely controlled by an operator using tactile push buttons located in the train (14) to retract the sliding ramp (10) back into the train (4) to allow the train doors to close.

O. General Notes

The Sliding Ramp (10) is preferably made from an electrically non-conductive composite material, with a minimum weight and with the required structural strength.

The Sliding Ramp (10) has the adequate number of Side Wheels (11), to enable skating inside the Casing Box (12) and provide access to each side of the train.

The surface of the Sliding Ramp (10) is preferably covered with a non-slippery coating. The non-slip coating may consist of a rubberised paint or a textured surface providing additional grip for a person using the Sliding Ramp (10).

The D-MAR (01) is built using standard materials and equipment, approved composite and electrical non-conductive components, in accordance with rail industry, safety Standards and requirements.

Deployment of all mechanical components will be controlled through a microprocessor-based electrical system which will be housed within a dedicated enclosure. Standard deployment of the system will be through timing and events-based triggering, managed by the microprocessor.

All mechanical movement of the ramp deployment will be tracked and controlled through optical and proximity sensor feedback to the microprocessor. Hard limit switches will be used to detect when the ramp has reached predetermined limits for fail-safe systems.

Embodiments of the D-MAR can be installed in relatively short timeframes and at costs generally lower than existing solutions.

The D-MAR can be easily relocated, replaced or simply removed, with minimum remediation works.

The D-MAR will be custom designed to satisfy the general Standard obligations and the Stakeholders' requirements, to fulfil the function of the ramp, to satisfy any train access requirement or any loading capacity.

LIST OF D-MAR COMPONENTS

1. Descending Mechanised Access Ramp (D-MAR);
2. Platform of the Train Station;
3. Boarding Assistance Zone;
4. Passengers Train;
5. Safety Bollards;
6. Flashing Lights on Safety Bollards;
7. Disabled Person on Wheelchair;
8. Nose of the Sliding Ramp;
9. Train Floor;
10. Sliding Ramp
11. Side Wheels of the Sliding Ramp;
12. Casing Box;
13. Tactile Push Button on Bollards;
14. Tactile Push Buttons in the Train;
15. Safety Edge of the Sliding Ramp;
16. Ballast;
17. Vertical Gap between Platform and Train Floor;
18. Horizontal Gap between Platform and Train Floor;
19. Handrail;
20. Optical and/or Proximity Sensors on the Train Floor;
21. Optical and/or Proximity Sensors on the Nose of the Sliding Ramp;
22. Electromechanical Swing Operator;
23. Telescopic Swing Arm;
24. Elbow Arm;
25. Guidance "C" Profile;
26. Limit Switch;
27. Hole in the Sliding Ramp;
28. Scissors and Jack System;
29. Electric or Hydraulic Jack;
30. Rack;
31. Pinion;
32. Electrical Motor;
33. Teeth Belt or Chain;
34. Pulley;
35. Mobile Protection Wall;
36. Bollard on Mobile Protection Walls;
37. Wheelchair Kerb on Mobile Protection Wall.

The claims defining the invention are as follows:

1. A Descending Mechanised Access Ramp (D-MAR) system for providing independent access for at least one person or merchandise between a floor of a train, bus or tramway and a vehicle platform, the D-MAR system including:

a slidably moveable ramp;

a substantially planar casing box mountable to or embedded within the floor of the train, bus or tramway, wherein the slidably moveable ramp is adapted to be slidably moveable within the substantially planar casing box;

a remote-controlled deployment mechanism configured to automatically deploy the slidably moveable ramp between a stand-by position on or in the floor of the train, bus or tramway and a fully deployed position, such that in the fully deployed position, a nose of the slidably moveable ramp is slidably engaged with the vehicle platform; and wherein the remote-controlled deployment mechanism is further configured to automatically move one or more mobile protection walls into an engaged position in relation to the fully deployed slidably moveable ramp, to provide safe access for the at least one person, wherein the mobile protection walls are installed on the vehicle platform, wherein the system includes one or more tactile push buttons that are configured to trigger flashing lights installed on the one or more mobile protection walls and to activate the remote-controlled deployment mechanism of the D-MAR.

2. The system of claim 1, including a plurality of side wheels installed on sides of the slidably moveable ramp, adapted to allow the slidably moveable ramp to be moveable inside the substantially planar casing box.

3. The system of claim 1, including one or more sensors installed on the train, bus or tramway and one or more sensors installed on the slidably moveable ramp to control the deployment of the slidably moveable ramp.

4. The system of claim 1, including a wireless communication system having an in-vehicle system onboard the train, bus or tramway and an on-platform system located on the vehicle platform, the wireless communication system being configured to wirelessly communicate a signal indicating an intent to deploy the slidably moveable ramp between the in-vehicle system and the on-platform system.

5. The system of claim 1, wherein the substantially planar casing box has a profile adapted such that, a width and a height is sufficient to allow the slidably moveable ramp to be fully stored within the casing box in the stand-by position and to permit an angular deployment of the slidably moveable ramp onto the vehicle platform.

6. The system according to claim 1, wherein the one or more mobile protection walls are installed on each side of a boarding assistance zone, in order to provide a safe passage of persons to/from the train, bus or tramway.

7. The system according to claim 1, wherein the remote-controlled deployment mechanism includes a scissor structure and jack system for enabling the sliding ramp to slidably move longitudinally inside the casing box and to allow an angular deployment of the sliding ramp onto the vehicle platform.

8. The system according to claim 1, wherein the remote-controlled deployment mechanism includes a rack and pinion steering system for enabling the slidably moveable ramp to slidably move longitudinally and to allow an angular deployment of the slidably moveable ramp onto the vehicle platform.

9. The system according to claim 1, wherein the remote-controlled deployment mechanism includes a teeth belt or chain and pulley system for enabling the sliding ramp to slidably move longitudinally and to allow an angular deployment of the slidably moveable ramp onto the vehicle platform.

10. The system according to claim 1, wherein the D-MAR system is installed on a new train, bus or tramway, during the manufacture of the vehicle.

11. The system according to claim 1 wherein the D-MAR retrofits to existing trains, buses or tramways.

12. The system according to claim 1 wherein the vehicle is used to transport passengers and/or merchandise.

13. The system according to claim 1 wherein the one or more mobile protection walls include a handrail and a wheelchair kerb.

14. A Descending Mechanised Access Ramp (D-MAR) system for providing independent access for at least one person or merchandise between a floor of a train, bus or tramway and a vehicle platform, the D-MAR system including:

a slidably moveable ramp;

a substantially planar casing box mountable to or embedded within the floor of the train, bus or tramway, wherein the slidably moveable ramp is adapted to be slidably moveable within the substantially planar casing box;

a remote-controlled deployment mechanism configured to automatically deploy the slidably moveable ramp between a stand-by position on or in the floor of the train, bus or tramway and a fully deployed position, such that in the fully deployed position, a nose of the slidably moveable ramp is slidably engaged with the vehicle platform; and wherein the remote-controlled deployment mechanism is further configured to automatically move one or more mobile protection walls into an engaged position in relation to the fully deployed slidably moveable ramp, to provide safe access for the at least one person, wherein the mobile protection walls are installed on the vehicle platform, wherein the remote-controlled deployment mechanism includes an electromechanical swing system for enabling the slidably moveable ramp an angular deployment onto the vehicle platform.

15. A system for providing independent access to a vehicle, the vehicle having at least two opposing entry/exit points, the system comprising:

at least one slidably moveable ramp positioned on a floor of the vehicle between the at least two opposing entry/exit points;

a remote-controlled deployment mechanism configured to automatically move one or more mobile protection walls into an engaged position in relation to the at least one slidably moveable ramp in a fully deployed position, to provide access for the at least one person;

a mechanism adapted for operation of the at least one slidably moveable ramp in at least a plurality of configurations; and wherein, the plurality of configurations includes at least:

i. a standby configuration, wherein the at least one slidably moveable ramp is substantially positioned between the at least two opposing entry/exit points;

ii. a first entry/exit configuration, wherein the at least one slidably moveable ramp is extended outside one of the at least two opposing entry/exit points to a first surface external to the vehicle; and iii. a second entry/exit position, wherein the at least one slidably moveable ramp is extended outside an opposing entry/exit point to a second surface external to the vehicle;

wherein the mobile protection walls are installed on the first or second surface external to the vehicle.

* * * * *